United States Patent [19]

Tsuboi et al.

[11] Patent Number: 4,979,031
[45] Date of Patent: Dec. 18, 1990

[54] DIGITAL COLOR COPYING MACHINE

[75] Inventors: Toshio Tsuboi; Keiji Nakatani; Shigeru Moriya, all of Osaka, Japan

[73] Assignee: Minolta Camera Kabushiki Kaisha, Japan

[21] Appl. No.: 378,299

[22] Filed: Jul. 11, 1989

[30] Foreign Application Priority Data

Jul. 12, 1988 [JP] Japan ................................ 63-173373
Jul. 12, 1988 [JP] Japan ................................ 63-173374

[51] Int. Cl.⁵ ................................................. H04N 1/46
[52] U.S. Cl. ........................................ 358/75; 358/80
[58] Field of Search ................................... 358/75, 80

[56] References Cited

U.S. PATENT DOCUMENTS

| | | | |
|---|---|---|---|
| 4,032,969 | 6/1977 | Ueda | 358/80 |
| 4,275,958 | 6/1981 | Tachika et al. | |
| 4,674,861 | 6/1987 | Kawamura | |
| 4,755,852 | 7/1988 | Fujita | |
| 4,839,722 | 6/1989 | Barry | 358/80 |
| 4,870,506 | 9/1987 | Narauchi | 350/75 |

FOREIGN PATENT DOCUMENTS

| | | |
|---|---|---|
| 49-131317 | 4/1973 | Japan |
| 57-61372 | 4/1982 | Japan |
| 60-216670 | 10/1985 | Japan |
| 60-239764 | 11/1985 | Japan |

Primary Examiner—Howard W. Britton
Assistant Examiner—Michael Lee

[57] ABSTRACT

A digital color copying machine including a mosaic monitor mode is disclosed. In the mosaic monitor mode, image data corresponding to a partial area of an original document is stored in a RAM. The image data is then read repeatedly from the RAM and a plurality of images of the partial area which have been subjected to different color adjustments are formed on a recording medium, so as to form a mosaic monitor image. The operator may then choose a desired color adjustment from the plurality of color adjusted images. Also, an operator may vary a parameter in the color adjustment process to obtain either greater or more minute color adjustments.

25 Claims, 12 Drawing Sheets

DIGITAL COLOR COPYING MACHINE

BACKGROUND OF THE INVENTION

1. Field of the Invention

The present invention relates to a digital color copying machine, and more particularly, to a digital copying machine capable of performing a mosaic monitor mode for making a color adjustment.

2. Description of the Related Art

A conventional digital color copying machine comprises a reading section for reading an image of a document by using a color image sensor and converting the image of the document into image data for printing, and a printer section for printing an image of the document on a copying paper according to the image data. In the case that plural color images are to be superimposed on a copying paper, the document is read repeatedly by the reading section, and each color image is printed on the same copying paper by the printer section in the order of respective colors predetermined.

The reading section comprises a masking process for generating a color-corrected signal corresponding to printing characteristics of the printer section. Generally speaking, it is difficult for the masking process circuit to minimize the color difference between the real document and the copy thereof with respect to all the colors contained therein. Therefore, in the case where a copy is further copied as a document, the color tone of the secondary copy may be considerably different from that of the original document. However, in a limited color tone range, if a better color balance adjustment is performed, the variation of the color tone can be minimized.

Conventionally, the color balance adjustment is performed in a manner of so-called cut and try. In this case, the scanning operation of the document is repeated a number of times, the number of times being a product of the number of times the color balance operation is needed to obtain a desired color copy and the number of the printing colors. Therefore, the color balance operation is time consuming and laborious.

The inventors of the present invention have proposed a color adjustment selecting method (referred to as a mosaic monitor method hereinafter) for decreasing time and cost required for the color correction in the U.S. patent application Ser. No. 321,405. In this mosaic method, an area of a document (referred to as a specific area hereinafter) including a partial image, for example a face of a person, is set by a specific area setting means. Then, image data from each specific area is stored in an image memory means. Next, a color adjustment is made for the image data read from the image memory means with predetermined various color correction levels, and the various sets of color corrected image data are printed at different positions on the same copying paper in a mosaic-like pattern. Thereafter, the operator selects an image having a color balance nearest to that of the document or an image having a color balance desirable for the operator from plural images of the specific area (referred to as a mosaic monitor image hereinafter) which have been reproduced with different color balances, respectively. Thereafter, a copy of the whole area of the document is produced based on the color correction level of the mosaic monitor image selected. Thus, a copy of the document having a desirable color balance can be obtained easily.

However, in the case that there is no image for which a desirable color adjustment is made in the mosaic monitor mode, the operator has to repeat the mosaic monitor operation until an image having a desirable color balance is obtained. In this case, the document is scanned many times repeatedly. In particular, if the operator wishes to reproduce a skin color of a portrait faithfully, the color balance adjustment has to be performed repeatedly until a desirable skin color of the portrait is realized. Further, in such a case that the operator wishes to vary the standard color correction level, it is desirable to print mosaic monitor images after the standard color correction level has been changed.

Furthermore, in a copying machine wherein the density level is adjustable according to the density of the document image, the density level may be different from a standard level upon entering the mosaic monitor mode. In such a case, the mosaic monitor images are printed on a copying paper with the set density level.

Since the density level is closely related to the color balance of individual mosaic image, the color balance selected at a density level different from the standard density level may give a different color balance under the standard density level.

SUMMARY OF THE INVENTION

An essential object of the present invention is to provide a digital color copying machine comprising a mosaic monitor mode, which is able to vary the color correction level easily.

Another object of the present invention is to provide a digital color copying machine comprising a mosaic monitor mode, which is able to prevent the selection of a color correcting level by mistake.

According to one aspect of the present invention, there is provided a digital color copying machine comprising: image reading means for scanning an original document image and generating image data; color altering means for altering the color indicated by the image data generated by the image reading means; image forming means for forming the original document image on a recording medium in response to the image data generated by the color altering means; area indicating means for indicating a partial area of the original document image; memory means for storing a collection of the image data corresponding to the partial area indicated by the area indicating means; inputting means for manually inputting alteration data related to color alteration by the color altering means; test image signal generating means for reading out the collection of image data stored in said memory means, applying the color altering means to it repeatedly, and performing different color alterations on plural collections of the image data repeatedly using the alteration data inputted by said inputting means, thereby generating plural sets of test image data when the test mode is set by the mode indicating means; and control means for controlling the drive of the image forming means in response to the plural sets of test image data generated by the test image generating means, and for forming on predetermined areas of a recording medium a plurality of images of the partial area of the document which have been subjected to different color alterations.

According to another aspect of the present invention, there is provided a digital color copying machine comprising: image reading means for scanning an original document image and generating image data indicating a color; color adjusting means for adjusting the image data generated by said image reading means; image forming means for forming the original document image on a recording medium in response to the image data adjusted by said color adjusting means; mode indicating means for indicating a test mode; inputting means for manually inputting color tone adjustment data to the color adjusting means; and test image forming means for performing a plurality of color adjustment processes using different color tones on a partial specific area of the original document image through use of the color adjusting means, thereby forming a plurality of images of the partial specific area having different color tones and in different positions on the recording medium.

According to a further aspect of the present invention, there is provided an image recording apparatus for forming an image on a recording medium in accordance with image data indicating a color, which comprises: inputting means for manually inputting adjustment data; color adjusting means for performing different adjustments to the image data in accordance with the adjustment data and for generating sets of a color adjusted image data indicating different color tones; and image forming means for forming a plurality of images having different color tones in different positions of the recording medium in accordance with the color adjusted image data generated by the adjusting means.

According to a still further aspect of the present invention, there is provided an image recording apparatus for forming an image on a recording medium in accordance with image data which comprises: memory means for storing a collection of image data indicating a color of a partial specific area of an entire image; inputting means for manually inputting adjustment data related to color adjustment; test image data generating means for repeatedly reading the collection of image data stored in the memory means and for repeatedly performing different adjustments on plural collections of image data in accordance with the adjustment data, thereby generating test image data corresponding to a test image which includes images of said specific part in different color tones; and image forming means for forming said test image on the recording medium.

According to a still more further aspect of the present invention, there is provided an image recording apparatus for forming an image on a recording medium in accordance with image data indicating a color, which comprises: color adjusting means for adjusting the image data; means for providing image data corresponding to a partial specific area of an entire image to the color adjusting means repeatedly; inputting means for manually inputting color alteration data related to a parameter used in the calculations of the color adjusting means; varying means for automatically varying the parameter of the calculation synchronously with the operation of said providing means; and image forming means for forming a plurality of images corresponding to the partial specific area with different color tones on the recording medium in accordance with the adjusted image data.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENT

The preferred embodiment according to the present invention will be described below under the following headings:

(1) Composition of the digital color copying machine;
(2) Action of the mosaic monitor and color correction adjustment function;
(3) The color tone setting circuit;
(4) The image memory circuit;
(5) Control flow in the mosaic monitor mode.

(1) Composition of the digital color copying machine

A digital color copying machine of the preferred embodiment according to the present invention comprises a reading section 100 for reading an image of a document using an image sensor and converting the image of the document into image data, and a printer section 200 for printing the image corresponding to the image data on a copying paper using the electrophotographic process.

In the copy machine, a multi-color copy is obtained by repeating an image reading process by the image reading section 100 and an image forming process by the printer section 200 with respect to each of a set of printing colors. That is, the reading section 100 reads the image of the document corresponding to respective colors of yellow, magenta and cyan, respectively, and outputs respective color image data to the printer section 200. The printer section 200 forms respective color images according to respective color image data outputted from the reading section 100. Thus, respective color images are superimposed on a copying paper so as to form a color image.

Figure 1:
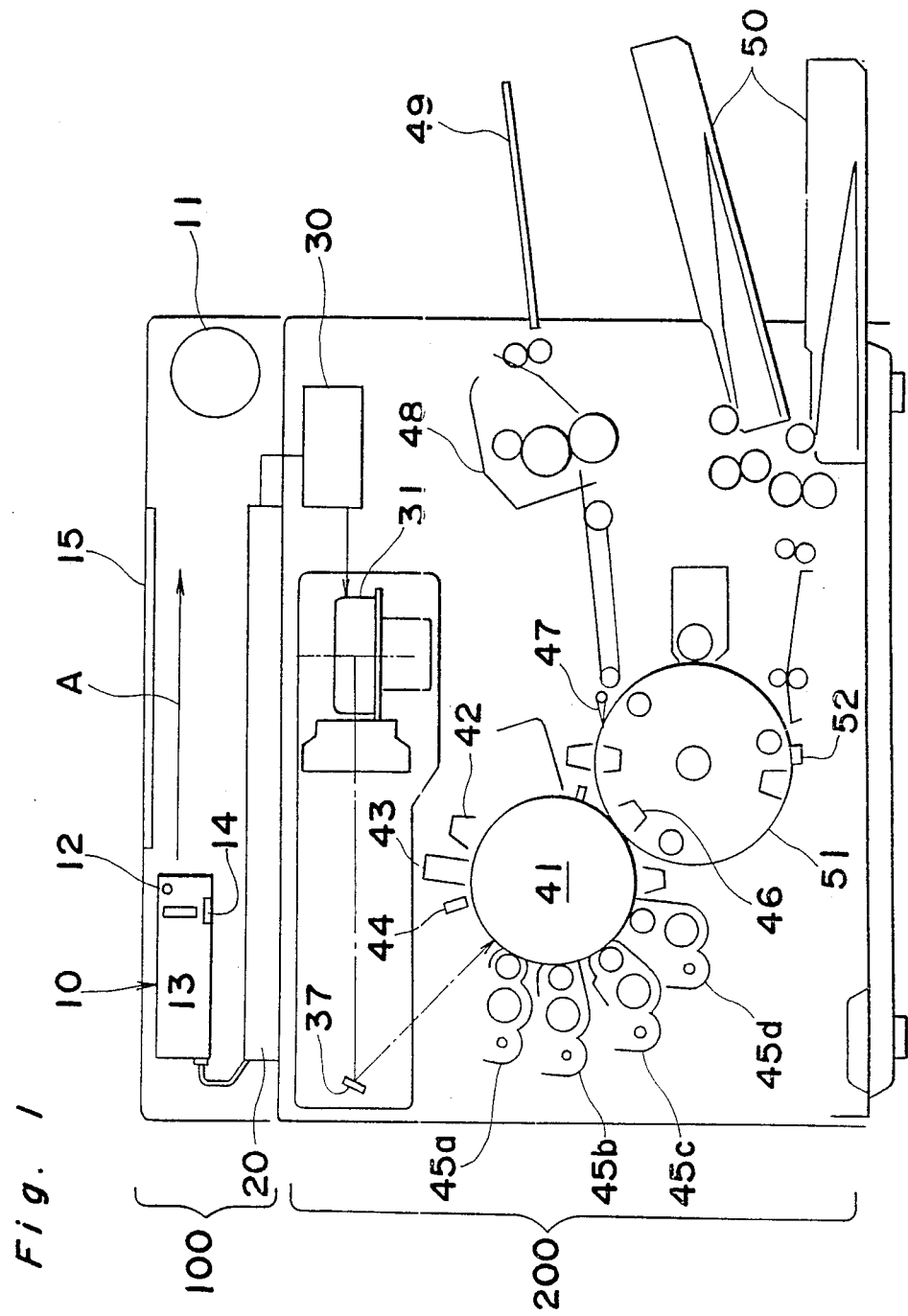
FIG. 1 is a schematic longitudinal cross sectional view of a digital color copying machine of the preferred embodiment according to the present invention.

FIG. 1 shows the whole composition of the digital color copying machine of the preferred embodiment according to the present invention.

Referring to FIG. 1, a scanner 10 comprises an exposure lamp 12 for illuminating the document, a rod lens array 13 for condensing the light reflected from the document, and a CCD color image sensor 14 for converting the condensed light into an electrical signal. The scanner 10 is moved in a direction indicated by an arrow A by a motor 11 upon reading the document so as to scan the document set on a platen 15. The image of the document illuminated by a light source is converted into electric signals of red color, green color and blue color by the CCD color image sensor 14.

The electric signals outputted from the CCD color image sensor 14 are converted into digital image data corresponding to each of a red color image, a green color image and a blue color image of the document, and individual color image data are stored in a buffer memory 30.

Figure 2:
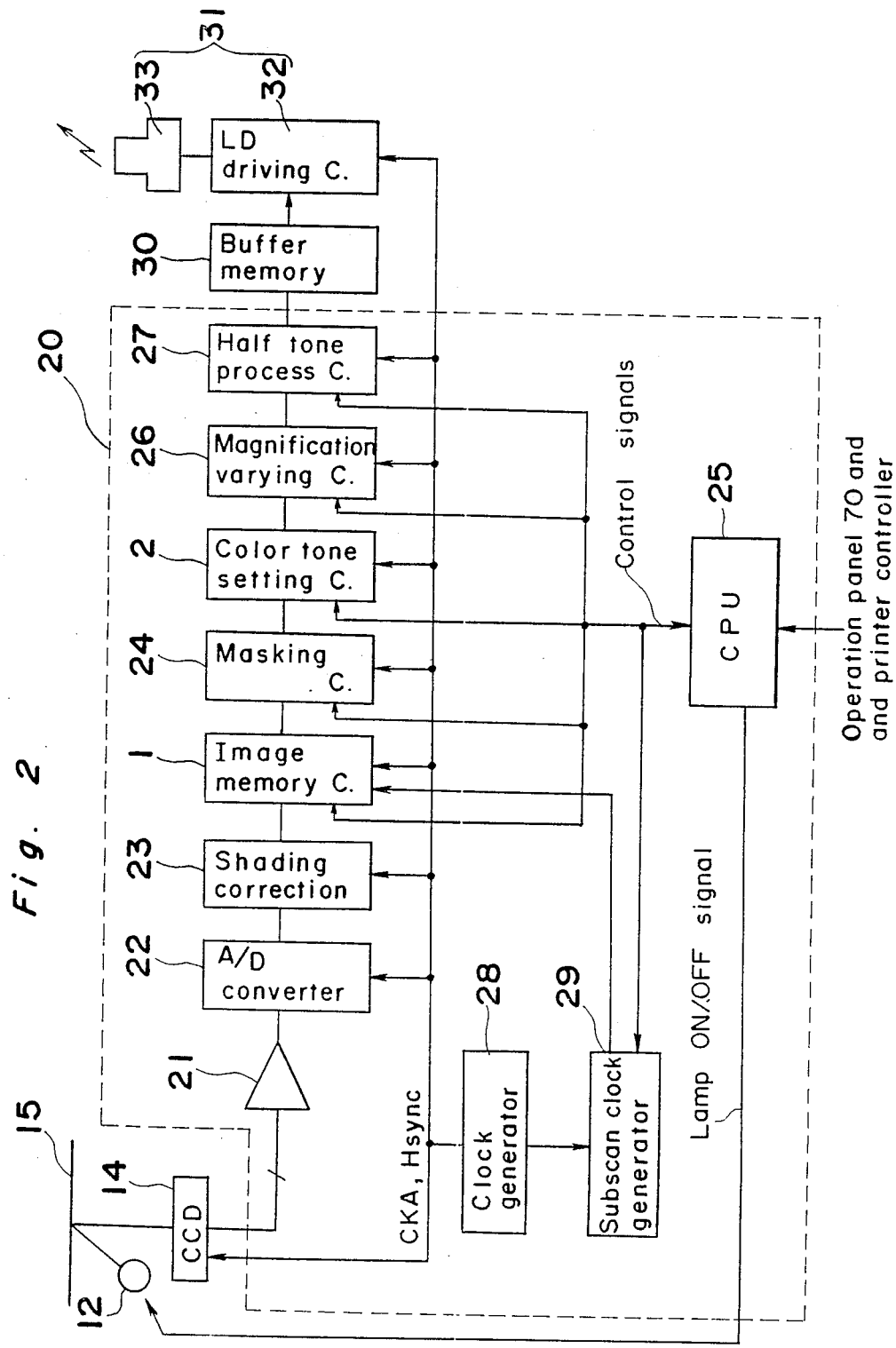
FIG. 2 is a schematic block diagram of a signal processing section shown in FIG. 1.

Referring to FIG. 2, a print head 31 comprises an LD driving circuit 32 and a semiconductor laser (LD) 33. The LD driving circuit 32 drives the semiconductor laser 33 according to the image data read out from the buffer memory 30.

Referring back to FIG. 1, a laser beam generated from the semiconductor laser 33 is deflected in the axial direction of a photoconductive drum 41 by an optical means (not shown) such as a polygon mirror etc., and is projected onto the surface of the rotating photoconductive drum 41 through a reflection mirror 37. Then, the image of the document is formed on the surface of the photoconductive drum 41. Before the laser beam is projected onto the photoconductive drum 41, the photoconductive drum 41 is illuminated by an eraser lamp 42, is electrified by a corona charger 43, and is illuminated by another eraser lamp 44. Thereafter, the above laser beam is projected onto the surface of the photoconductive drum 41 so as to form an electrostatic latent image thereon. After one of a yellow color toner developing unit 45a, a magenta color toner developing unit 45b, a cyan color toner developing unit 45c, and a black color toner developing unit 45d is activated, the electrostatic latent image formed on the surface of the photoconductive drum 41 is developed into a visible toner image. The developed visible toner image is transferred onto a copying paper which is wound around a transfer drum 51.

The image forming process is repeated with respect to four colors (yellow, magenta, cyan and black) so as to form a color image on a copying paper. The scanner 10 is driven synchronously with the rotations of the photoconductive drum 41 and the transfer drum 51 during the image forming process. Thereafter, a separating nail member 47 is enabled so that the copying paper is separated from the transfer drum 41, and thereafter, the copying paper is fixed by a fixing unit 48 and is discharged to a paper discharging tray 49.

It is to be noted that the copying paper is fed from a paper cassette 50, and the edge of the copying paper is chucked by a chucking mechanism 52 on the transfer drum 51. This prevents the copying paper from shifting during the image forming process, thereby preventing misalignment of the four color images.

FIG. 2 shows a signal processing section 20 for processing the electric signals outputted from the CCD color image sensor 14 so as to output the digital image signals corresponding to the electric signals.

Referring to FIG. 2, in the normal image forming process, the image signals outputted from the CCD color image sensor 14 are converted into electric signals corresponding to the density of the image by a logarithmic amplifier 21, and the electric signal outputted from the amplifier 21 is converted into digital data (multi-level) by an analog/digital converter 22 (referred to as an A/D converter hereinafter). A shading correction is performed with respect to individual image data of red color, green color and blue color by a shading correction circuit 23. In a mosaic monitor mode as described later, the image data outputted from the shading correction circuit 23 is stored in an image memory circuit 1. On the other hand, in a normal print mode for forming a normal color image on a copying paper, the image memory circuit 1 is disabled, and the image data outputted from the shading correction circuit 23 goes directly to a masking circuit 24.

Respective red color, green color and blue color image data are processed in parallel in the above data processing circuits. Thereafter, the masking circuit 24 generates yellow color, magenta color, cyan color and black color image data from the image data of red color, green color and blue color image data based on the characteristics of the printing toner designated, and the printing color is determined responsive to a control signal input from a CPU 25.

In the case when the color balance is to be altered in the mosaic monitor mode or the normal print mode, the color tone setting circuit 2 performs a color correction for the image data outputted from the masking circuit 24, and it outputs the corrected image data to a magnification varying circuit 26. When the color balance is to be kept unchanged, the color tone setting circuit 2 is disabled, the color correction is not performed, and the image data outputted from the masking circuit 24 is sent directly to the magnification varying circuit 26.

The magnification varying circuit 26 electrically processes the image data outputted from the masking circuit 24 or the color tone setting circuit 2 so as to vary the magnification of the image in the main scan direction by a well known manner, and outputs the generated image data to a half tone processing circuit 27. The magnification in the subscan direction is varied by varying the velocity of the scanner 10 for scanning the document.

The half tone processing circuit 27 binarizes the image data outputted from the magnification varying circuit 26 so as to generate the binary pseudo half tone signals and store them in the buffer memory 30. The LD driving circuit 32 drives the semiconductor laser 33 so as to generate a laser beam according to the pseudo half tone signals outputted from the buffer memory 30.

A clock generator 28 generates a horizontal synchronizing signal Hsync and a clock signal CKA for synchronizing the reading action of the CCD color image sensor 14 with the image data processing of respective circuits of the signal processing section 20. Furthermore, a subscan clock generator 29 generates a subscan clock for varying the magnification which is an interruption signal for outputting to the image memory circuit 1 in accordance with a control signal outputted from the CPU 25.

Figure 3:
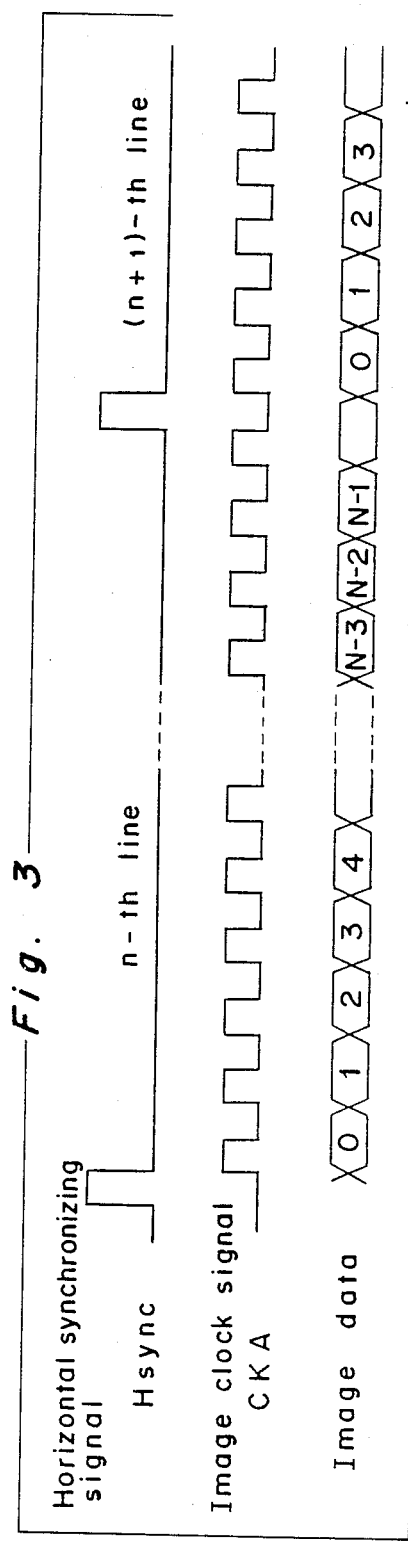
FIG. 3 is a timing chart showing an action of the signal processing section shown in FIG. 2.

FIG. 3 shows a timing chart of the image data which is processed in the signal processing section 20.

Referring to FIG. 3, the horizontal synchronizing signal Hsync and the clock signal CKA are generated by the clock generator 28, and the CCD color image sensor 14 outputs the red color, green color and blue color image data in serial synchronously with the clock signal CKA. In FIG. 3, the numerals indicated in the individual image data denote addresses in the main scan direction. Every time the horizontal synchronizing signal Hsync is generated, the line n in the main scan direction is renewed. Then, the scanner 10 is moved in the subscan direction by a unit distance.

Figure 4:
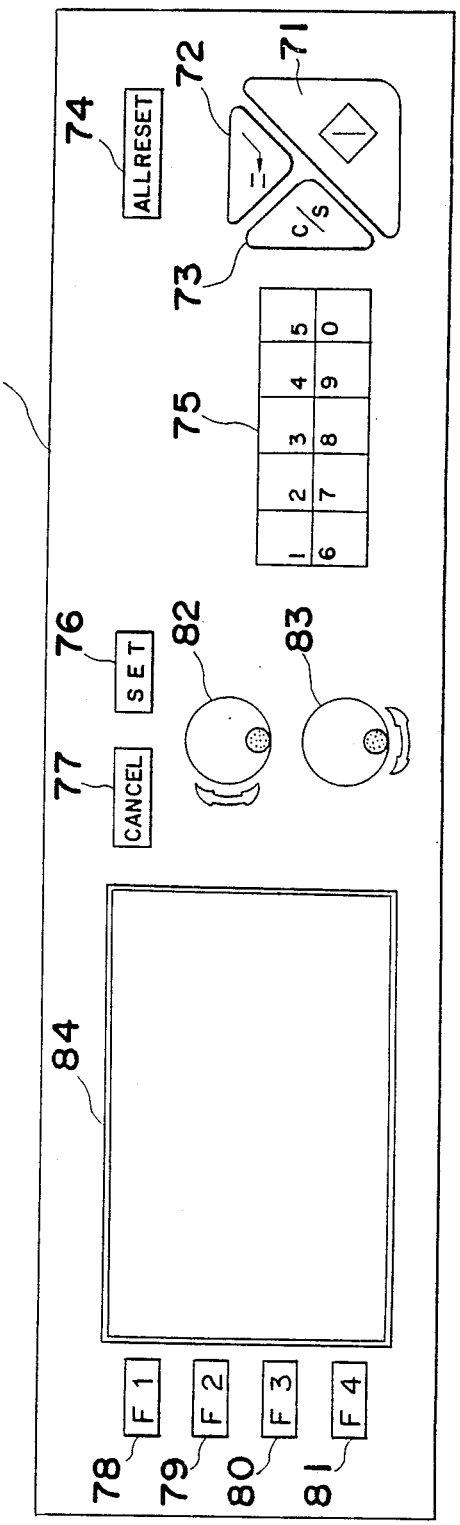
FIG. 4 is a top plan view of an operation panel of the digital color copying machine shown in FIG. 1.

FIG. 4 shows an operation panel 70 arranged on the main body of the copying machine.

Referring to FIG. 4, on the operation panel 70, there are arranged a print start key 71 for starting the copying operation, an interruption key 72 for instructing a copying interruption operation, a clear stop key 73, an all reset key 74, a set of ten keys 75, a set key 76, a cancel key 77, various kinds of function keys 78 to 81, jog dials 82 and 83 for setting the areas which are described below, a liquid crystal display section 84 for displaying the image of the document so as to set the areas described below and for displaying the various kinds of messages. The function key 78 is a selecting key for selecting the mosaic monitor mode and the function key 80 is a density correction key, respectively.

Figure 5:
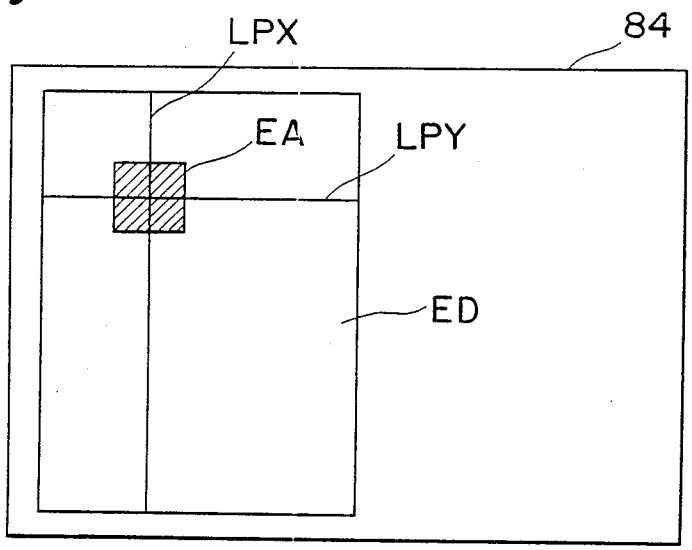
FIG. 5 is a front view of a display section of the operation panel shown in FIG. 4 upon setting a specific area thereon.

In the mosaic monitor mode described later in detail, the areas such as specific area, etc., are set as follows. For example, in the case of setting the specific area, as shown in FIG. 5, a document is set on the platen 15, and a preparatory scan is performed by the scanner 10. The image of the document is then roughly displayed on the document area ED of the display section 84 of the operation panel 70. As shown in FIG. 5, the intersection between a longitudinal instructing line LPX and a lateral instructing line LPY corresponds to the center of the square specific area EA. When the jog dials 82 and 83 are rotated, the instructing lines LPX and LPY are moved in the longitudinal direction and the lateral direction, respectively. Therefore, the specific area EA is set by rotating the jog dials 82 and 83. The set key 76 may then be pushed down, so that the specific area is set.

Figure 8:
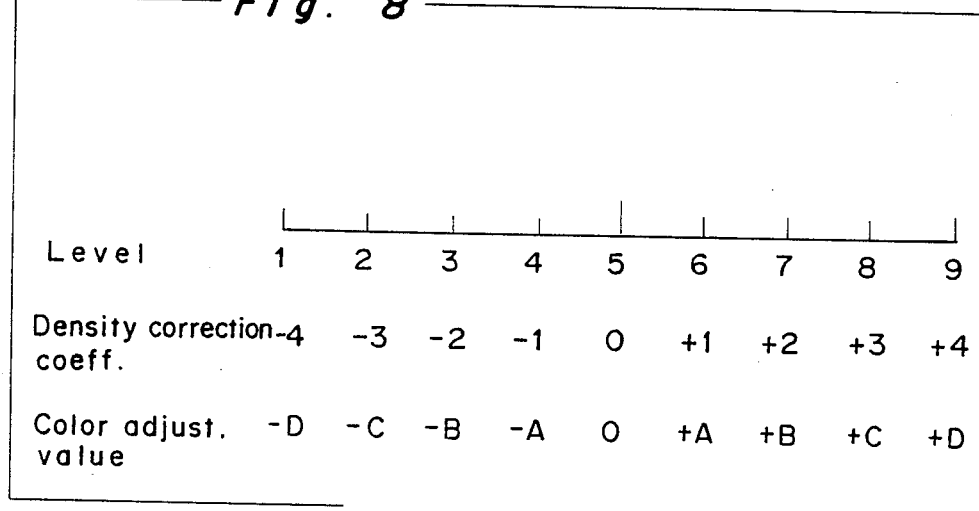
FIG. 8 is a view showing a relationship between nine level steps, the density correction coefficients, and the color adjustment values.

The density correction key 80 is used for varying the density adjustment coefficient so as to adjust the density of the image to be copied on the copying paper. In the present preferred embodiment, the density adjustment coefficient can be adjusted at nine steps as shown in FIG. 8. The level 5 is a standard value of the density adjustment coefficient, the levels larger than the level 6 are the density adjustment coefficients larger than the above standard value, and the levels smaller than the level 4 are the density adjustment coefficients smaller than the above standard value. Every time the density correction key 80 is pushed down, the level of the density adjustment coefficient is increased by one. Once the set value of the density adjustment coefficient becomes four, the level of the density adjustment coefficient becomes minus four when the density correction key 80 is pushed down again. The level, the density correction coefficient and the color correction adjustment value shown in FIG. 8 are displayed on the display section 84, wherein the numeral of the selecting level (which is between one and nine) is displayed in the form of an inverted character on the display section 84. An electric signal corresponding to the level selected is sent to the CPU 25, and the CPU 25 sets the density correction coefficient accordingly. The CPU 25 also varies an electrifying quantity, etc., so as to vary the adhering quantity of tones, so that the density of the image printed on the copying paper is adjusted. It is to be noted that the density correction key 80 cannot be used in the mosaic monitor mode to vary the density correction coefficient, since the density correction coefficient is set at the standard value automatically in the mosaic monitor mode. The density correction key 80 can be used as the color correction key in the mosaic monitor mode.

(2) Action of the mosaic monitor and color correction adjustment function.

The mosaic monitor is performed by the image memory circuit 1 and the color tone setting circuit 2.

The mosaic monitor mode is selected when the function key 78 of the operation panel 70 is pushed down. The mosaic monitor makes various color corrections to the image of a specific area EA set by the operator and prints images of the specific area EA having different color balances (referred to as mosaic monitor images hereinafter) on the same copying paper. Therefore, an image having a desirable color balance can be selected by an operator by observing a mosaic monitor image. When the operator selects an image having a desirable color balance among the mosaic monitor images, he need only press a key on the operation panel 70, and the color adjustment coefficients for the color adjustment of the selected image are automatically set. Thereafter, the printing operation is performed by using the selected color adjustment coefficients.

In the mosaic monitor mode, a specific area EA for which the color adjustment is to be made (for example, an area indicated by oblique lines) is set by the operator using the image of the document displayed on the display section 84 and the jog dials 82 and 83. When the specific area EA is set, the image memory circuit 1 stores image data I corresponding to the specific area EA in a random access memory 401 (referred to as a RAM hereinafter) shown in FIG. 10. It should be noted that the upper limit of the size of the specific area EA is predetermined according to the memory capacity of the RAM 401.

Thereafter, the color tone setting circuit 2 performs various kinds of color correction on the image data I, which is outputted from the image memory circuit 1 and converted into the printing image data. The coefficients Ky, Km and Kc are the color adjustment coefficients K for yellow color, magenta color and cyan color, respectively.

Figure 6:
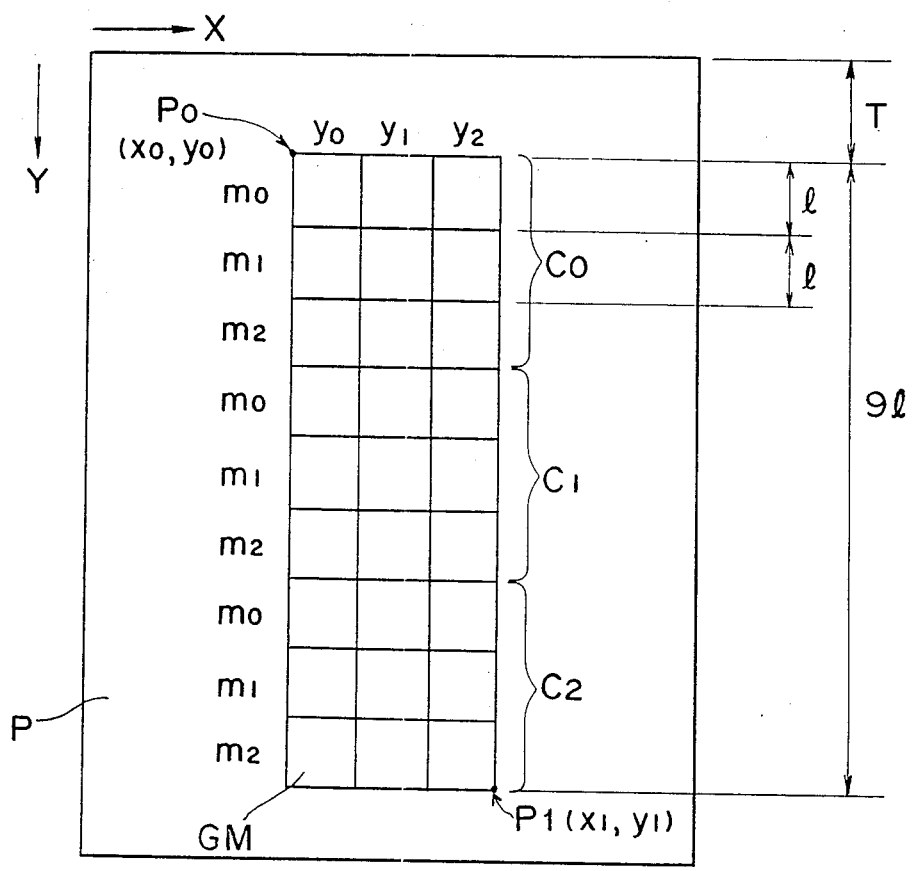
FIG. 6 is a view of an output format of a mosaic monitor image displayed on the display section shown in FIG. 4.

FIG. 6 shows on example of the output format of the printing image data I'.

Referring to FIG. 6, three color adjustment coefficients $Ky=y_i$, $Km=m_i$ and $Kc=c_i$ ($i=0, 1, 2$) are used for each of the three colors, i.e., cyan color (c), magenta color (m) and yellow color (y), and 27 images ($3 \times 3 \times 3 = 27$) are then outputted. The color adjustment coefficients $c_1$, $m_1$ and $y_1$ represent standard values of cyan, magenta and yellow color, respectively. The color adjustment coefficients $c_0$, $m_0$ and $y_0$ represent values which are products of the standard value and a predetermined factor smaller than one. The color adjustment coefficients $c_2$, $m_2$ and $y_2$ represent values which are products of the standard value and another predetermined factor larger than one.

The operator selects a suitable color tone among the images in the mosaic monitor image GM shown in FIG. 6, and the process of the mosaic monitor mode is completed.

For example, the function keys 78 and 81 can be operated according to a message displayed on the display section 84 of the operation panel 70 to select one image from the mosaic image GM, and the color balance for processing an image is therefore specified. Or, after making the image block shown in FIG. 6 display on the display section 84, the function keys 78 to 81 and the ten keys 75 may be operated so as to select one of the mosaic images GM.

The image of the document is then read out again by the reading section 100, and the image having the set color tone is printed by the printer section 200.

There are various kinds of needs an operator may have of the mosaic monitor mode, and for example, the operator may wish to vary the color balance greatly or minutely. In the present preferred embodiment, a color correction adjustment function for the mosaic monitor is provided for satisfying that need.

The color adjustment coefficients Ky, Km and Kc can be altered before the mosaic monitor mode is performed or after the operator observes the printed mosaic monitor image.

In the preferred embodiment, the color adjustment coefficients $c_i$, $m_i$ and $y_i$ (i=0, 2) are obtained by subtracting a predetermined value $a_0$ from the standard color adjustment coefficients $c_1$, $m_1$ and $y_1$, or adding the predetermined adjustment value $a_0$ to the standard color adjustment coefficients $c_1$, $m_1$ and $y_1$. Therefore, before the mosaic monitor is performed, the adjustment can be performed by altering the adjustment value $a_0$, wherein the adjustment value $a_0$ can be set by the ten keys 75 on the operation panel 70. Thus, the color adjustment coefficients are altered as follows:

$$y_0 = y_1 - a_0$$

$$y_2 = y_1 + a_0$$

$$m_0 = m_1 - a_0$$

$$m_2 = m_1 + a_0$$

$$c_0 = c_1 - a_0$$

$$c_2 = c_1 + a_0$$

In order to make a large color adjustment, a large adjustment value $a_0$ is set. On the other hand, in order to make a small color adjustment, a small adjustment value $a_0$ is set.

Alternation of the color adjustment coefficients after observing the mosaic monitor images can also be accomplished by varying the adjustment value $a_0$. In this case, the adjustment value $a_0$ is varied using the density correction key 80 of the operation panel 70. In the mosaic monitor mode, the density adjustment coefficient is set at the standard value thereof since an image of a document is printed so that the density of the printed image is substantially the same as that of the image of the document (see step S52 in FIG. 13). Therefore, it is not necessary to make the density correction using the density correction key 80. In the mosaic monitor mode, the density correction key 80 is used as a color adjustment key.

Figure 7:
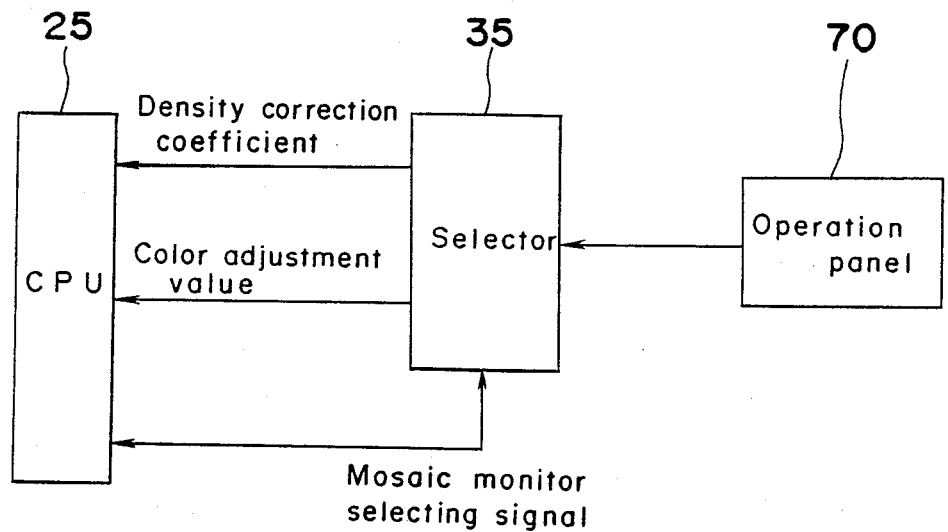
FIG. 7 is a schematic block diagram showing a connection relationship among a selector, the CPU and the operation panel.

In order to use the density correction key 80 as the color adjustment key, a selector 35 for switching over between the density correction and the color adjustment is arranged as shown in FIG. 7. When the selector 35 does not receive a mosaic monitor selecting signal from the CPU 25, the selector 35 outputs a signal input from the density correction key 80 of the operation panel 70 to the CPU 25 as a density correction coefficient signal. On the other hand, when the selector 35 receives the mosaic monitor selecting signal from the CPU 25, the selector 35 outputs the signal input from the density correction key 80 to the CPU 25 as a color adjustment value signal. That is, when the density correction key 80 of the operation panel 70 is pushed down once, the level of the color adjustment value increases by one step, and the level thereof is displayed in the form of a character on the display section 84. The level of the color adjustment value can be altered at nine steps as shown in FIG. 8. Thereafter, when the set key 76 is pushed down, the CPU 25 calculates the color adjustment coefficients $y_i$, $m_i$ and $c_i$ (i=0, 2) from the adjustment value $a_0$ corresponding to the above set level of the color adjustment value. Thus, the density correction key 80 is used as the color adjustment key.

When the level 5 shown in FIG. 8 is set according to the setting process for the color adjustment value, the standard color is selected as the color of the mosaic monitor image. In order to set a relatively large color difference between the adjacent steps of the mosaic monitor image, one of the levels 6, 7, 8, and 9 is selected so as to alter the adjustment value $a_0$. On the other hand, in order to set a relatively small color difference therebetween, either one of the levels 1, 2, 3, and 4 is selected so as to alter the adjustment value $a_0$. Thereafter, the color adjustment coefficients are altered as follows in a manner similar to the color adjustment made before the mosaic monitor mode is performed:

$$y_0 = y_1 - a_0$$

$$y_2 = y_1 + a_0$$

$$m_0 = m_1 - a_0$$

$$m_2 = m_1 + a_0$$

$$c_0 = c_1 - a_0$$

$$c_2 = c_1 + a_0$$

After the color adjustment is made in the above process, the image data stored in the RAM 401 is read out again, and the mosaic monitor image is reprinted according to the image data. Thereafter, a desirable color adjustment value is selected from the reprinted mosaic monitor image.

It is to be noted that, in the present preferred embodiment, 27 images, i.e., cyan color images, magenta color images and yellow color images respectively having three color adjustment coefficients $Ky = y_1$, $Km = m_i$ and $Kc = c_i$ (i=0,1,2) are printed in the mosaic monitor image. However, in a modification of the present preferred embodiment the mosaic monitor image could be printed with the cyan color images, the magenta color images and the yellow color images having more (such as five) color adjustment coefficients in order to make the color adjustment more varied. The number of steps for varying the color adjustment coefficients can be increased by controlling the reading area setting signal which the CPU 25 outputs to the image memory circuit 1, or by varying the color adjustment coefficients which the CPU 25 outputs to the color tone setting circuit 2.

(3) The color tone setting circuit.

Figure 9:
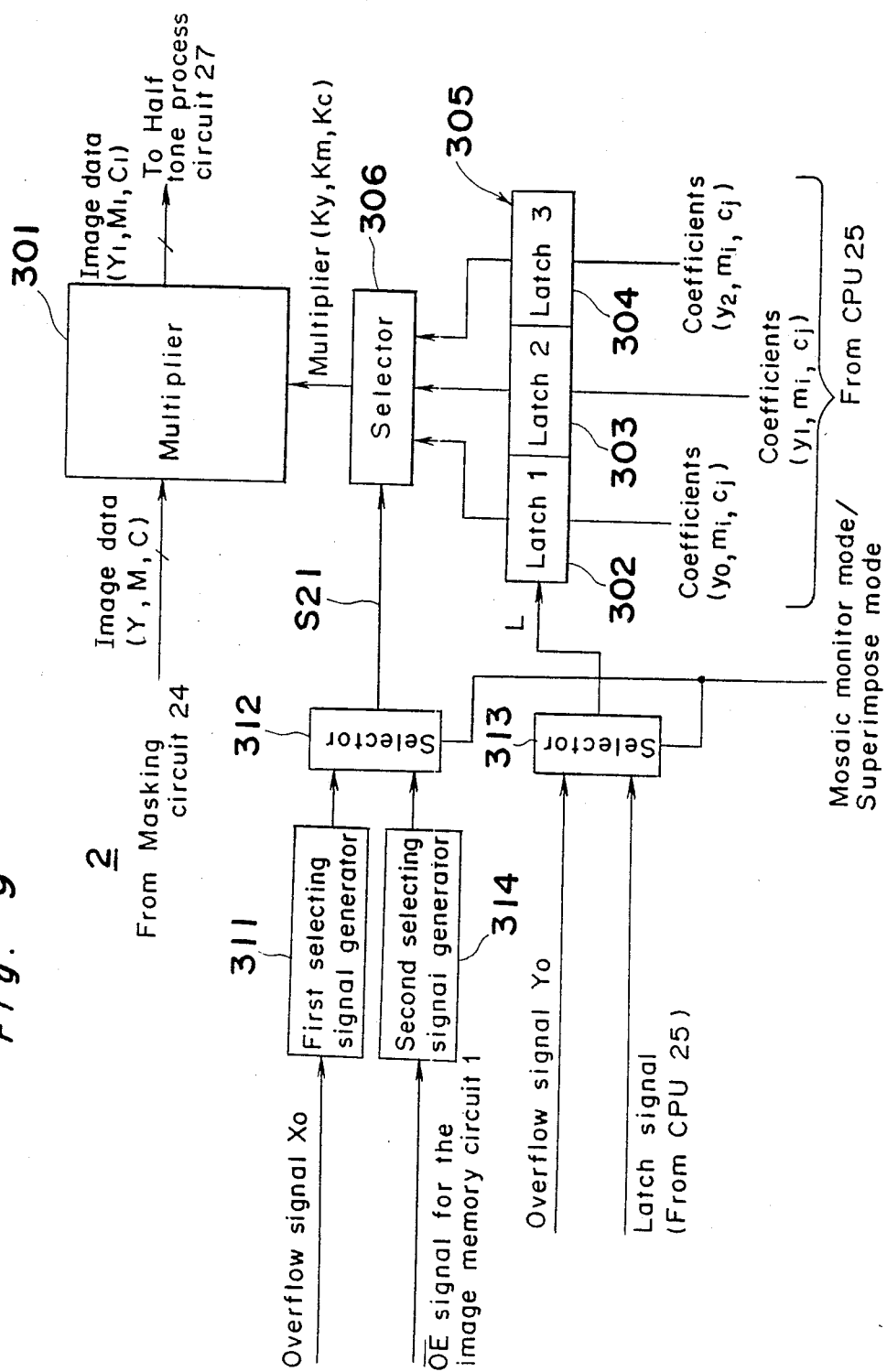
FIG. 9 is a schematic block diagram of a color tone setting circuit shown in FIG. 2.

FIG. 9 is a circuit diagram of the color tone setting circuit 2.

The color tone setting circuit 2 is arranged as the next step after the masking circuit 24, and makes the color adjustment in the mosaic monitor mode.

The masking circuit 24 converts respective red color image data, green color image data and blue color image data into yellow color image data, magenta color image data, cyan color image data and black color image data for printing, and outputs the converted image data to the color tone setting circuit 2.

The well known conversion equation for converting the original image data B, G and R into the printing image data Y, M and C is expressed as follows:

$$\begin{array}{c} Y \\ M \\ C \end{array} = \begin{array}{ccc} a_{00} & a_{01} & a_{02} \\ a_{10} & a_{11} & a_{12} \\ a_{20} & a_{21} & a_{22} \end{array} \begin{array}{c} B \\ G \\ R \end{array}$$

Respective conversion coefficients $a_{00}$ to $a_{22}$ are predetermined so that a color image reflecting that of the original document can faithfully be obtained.

In the color adjustment process of the color tone setting circuit 2, the following multiplications are performed on the image data Y, M and C obtained from the above calculation in order to obtain adjusted printing image data $Y_1$, $M_1$ and $C_1$:

$$Y_1 = K_y \times Y,$$

$$M_1 = K_m \times M,$$

$$C_1 = K_c \times C,$$

wherein $K_y$ is the color adjustment coefficient of the yellow color,

Km is the color adjustment coefficient of the magenta color, and

Kc is the color adjustment coefficient of the cyan color.

It is to be noted that, the printing image data K of black color is outputted for a picture element only when all of the sets of image data, i.e., yellow color image data, magenta color image data and cyan color image data, are outputted, since it is not necessary to make the black color adjustment otherwise.

In the mosaic monitor mode, different sets of color adjustment coefficients are applied to the respective blocks shown in FIG. 6. That is, the reading area designated by the coordinates $P_0$ ($x_0$, $y_0$) and $P_1$ ($x_1$, $y_1$) is divided into 27 blocks of three columns in the main scan direction X and nine rows in the subscan direction Y, and different sets of color adjustment coefficients are set at respective blocks. In this case, the color adjustment coefficient Ky of the yellow color does not vary in the subscan direction Y, however, the coefficient Ky varies in the main scan direction X so that three kinds of coefficients $y_0$, $y_1$ and $y_2$ are set at the three blocks in the main scan direction X, respectively. The color adjustment coefficient Km of magenta color does not vary in the main scan direction X, however, the coefficient Km varies in the subscan direction Y in the order of $m_0$, $m_1$, $m_2$, $m_0$, $m_1$, ... etc. The color adjustment coefficient kc of cyan color does not vary in the main scan direction X, however, the coefficient Kc varies in the subscan direction Y every three blocks in the order of $c_0$, $c_1$ and $c_2$.

Therefore, the color tone setting circuit 2 sets the color adjustment coefficients for every block of the mosaic monitor image as described above, and outputs the adjusted printing image data to the magnification varying circuit 26.

Referring to FIG. 9, a multiplier 301 calculates the aforementioned printing image data $Y_1$, $M_1$, and $C_1$ by using the above equations on the image data Y, M and C input from the masking circuit 24, and outputs the printing image data $Y_1$, $M_1$ and $C_1$ to the half tone process circuit 27. There is provided a latch circuit 305 comprised of three latches 302, 303 and 304 for respectively latching three coefficients in the main scan direction X in the mosaic monitor mode. The three coefficients are input from the CPU 25. Any three coefficients latched in the latch circuit 305 correspond to three blocks in the main scan direction, respectively. Every time a subscan clock signal for varying the magnification is input to the CPU 25 as an interruption signal, the CPU 25 performs an interruption process shown in FIG. 14a and 14b, and the CPU 25 outputs a latch signal to the color tone setting circuit 2 for another row in the subscan direction Y. Thus, the latches 302, 303 and 304 respectively latch new three coefficients corresponding to the next row in the subscan direction Y.

The reason the above latch circuit 305 is provided is because an alteration period for the above coefficients in the main scan direction is relatively shorter than the operation period of the CPU 25, and it is therefore difficult for the CPU 25 to set the above coefficients in the latches 302, 303 and 304 at real time. It is to be noted that, in the case of n kinds of color adjustment coefficients, n latches are provided in parallel.

The image memory circuit 1 outputs an overflow signal $X_0$ in the main scan direction when the image data stored in an image memory 401 is read out to a first selecting signal generator 311. Every time the first selecting signal generator 311 receives the overflow signal $X_0$, i.e., at every block of the mosaic monitor image, the first selecting signal generator 311 outputs a signal S21 to a selector 306 through a selector 312 so that the selector 306 connects the multiplier 301 selectively to respective latches 302 to 304. In accordance with the signal S21, the selector 306 sends one of the respective coefficients latched in the latches 302 to 304 to the multiplier 301 for each block.

On the other hand, the image memory circuit 1 outputs an overflow signal $Y_0$ in the subscan direction when the image data stored in the image memory 401 is read out to the selector 313. In the mosaic monitor mode, the selector 313 outputs the overflow signal $Y_0$ to the latch circuit 305. In accordance with the overflow signal $Y_0$, the latches 302 to 304 latch a new set of color adjustment coefficients from the CPU 25. That is, as soon as the row of blocks being processed is changed in the subscan direction to the next row of blocks, the set of color adjustment coefficients is altered.

In the mosaic monitor mode, when the operator selects a desirable set of color adjustment coefficients, the selected set of color adjustment coefficients may be set in the latch 302, and will be outputted to the multiplier 301.

(4) The image memory circuit.

Figure 10:
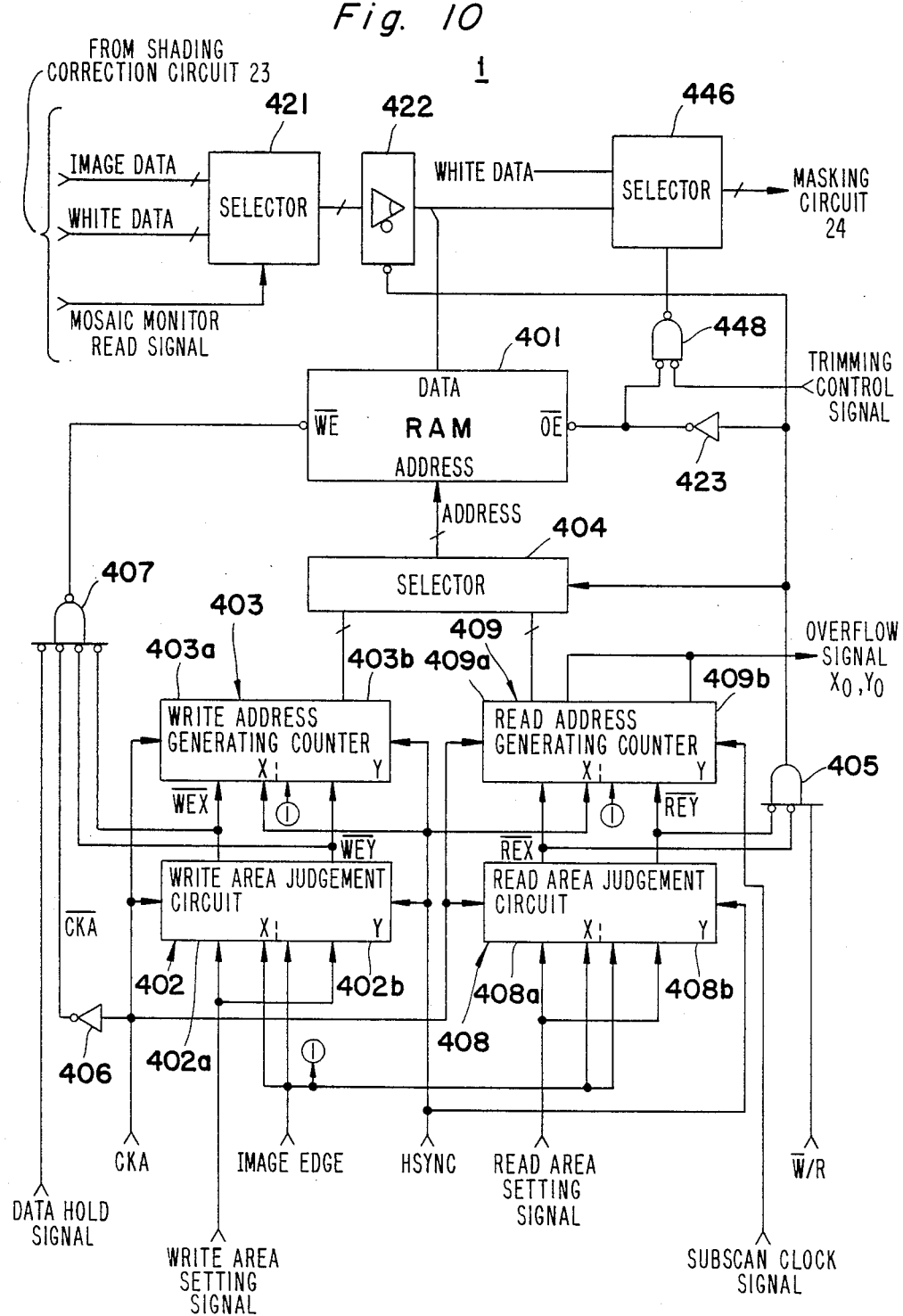
FIG. 10 is a schematic block diagram of an image memory circuit shown in FIG. 2.

FIG. 10 shows the image memory circuit 1 for storing an image of a specific area EA of a document (referred to as a registered image hereinafter) in the mosaic monitor mode, and for reading out the registered image to be printed on any specific position of a copying paper in order to print the registered image as part of the mosaic monitor image.

Referring to FIG. 10, the RAM 401 is provided for storing image data of the specific area EA. A selector 421 selects either image data which is processed with the shading correction in the shading correction circuit 23 or white data input from the shading correction circuit 23, in response to a mosaic read signal input from the shading correction circuit 23. The selector 421 then outputs the selected data to the RAM 401 and a selector 446 through a three-state buffer amplifier 422. The output terminal of the three-state buffer amplifier 422 is at a high impedance state only when the registered image is read out from the RAM 401 (i.e., $\overline{OE}$="1") which occurs upon printing the mosaic monitor image. In other cases, i.e., when the mosaic monitor image is not being printed in the mosaic monitor mode, the three-state buffer amplifier 422 outputs white data. Furthermore, when image data of a specific area EA of a document is being stored in the RAM 401 in the mosaic monitor mode, the three-state buffer amplifier 422 outputs the image data to the RAM 401.

When the image to be printed is a color image, it is often necessary to make a color adjustment. Therefore, the image data is stored in the RAM 401 temporarily by using the selector 446 and the three-state buffer amplifier 422 before the processes performed by the circuits 24, 25, 26 and 27. After the image data is read out from the RAM 401, various kinds of color adjustments are made for the mosaic monitor image, and the color-adjusted mosaic monitor image is printed on a copying paper.

A write area judgment circuit 402 judges whether or not the image data read by the reading section 100 is within a write area defined in the main scan direction X and the subscan direction Y, in accordance with write area setting signals in the main scan direction X and the subscan direction Y which are input from the CPU 25. When the image data read by the reading section 100 is within the above write area, the write area judgment circuit 402 outputs low level signals $\overline{WEX}$ and $\overline{WEY}$ to inverted input terminals of an AND gate 407 and a write address generating counter 403. The AND gate 407 outputs the clock signal $\overline{CKA}$ to a write enable terminal $\overline{WE}$ of the RAM 401 in accordance with the low level signals $\overline{WEX}$ and $\overline{WEY}$, so as to store the image data in the RAM 401.

Similarly, a read area judgment circuit 408 judges whether or not the image data read by the reading section 100 is within a read area defined in the main scan direction X and the subscan direction Y, in accordance with the read area setting signals in the main scan direction X and the subscan direction Y which are input from CPU 25. When the image data read by the reading section 100 is within the above read area, the read area judgment circuit 408 outputs low level signals $\overline{REX}$ and $\overline{REY}$ to inverted input terminals of an AND gate 405 and a read address generating counter 409. The above read area is predetermined according to the output format.

In accordance with low level signals $\overline{REX}$ and $\overline{REY}$, the AND gate 405 outputs a read signal $\overline{W/R}$ to an output enable terminal $\overline{OE}$ of the RAM 401 through an inverter 423, i.e., a low signal is input to the output terminal $\overline{OE}$ of the RAM 401 so that the reading operation of the RAM 401 is enabled.

The write address generating counter 403 generates a write address for storing image data in the RAM 401 in accordance with the clock signal CKA, the horizontal synchronizing signal Hsync, and the above signals $\overline{WEX}$ and $\overline{WEY}$, and outputs the write address to the address terminal of the RAM 401 through a selector 404. Similarly, the read address generating counter 409 generates a read address for reading out image data stored in the RAM 401 in accordance with the clock signal CKA, the subscan clock signal, and the above signals $\overline{REX}$ and $\overline{REY}$, and outputs the generated read address to the terminal of the RAM 401 through the selector 404. The above selector 404 selectively outputs either of the write address or the read address to the address terminal of the RAM 401 in accordance with the write/read signal $\overline{W/R}$. It is to be noted that both the write address and the read address are generated as an address of one dimension by a multiplier (not shown) based on an address in the main scan direction X and an address in the subscan direction Y generated by the write address generating counter 403 and the read address generating counter 409, respectively.

The action of the image memory circuit 1 will be described below in detail.

In the case when the registered image is stored in the RAM 401, and when the operator specifies a specific area EA of a document using the jog dials 82 and 83 as shown in FIG. 5, the CPU 25 calculates the coordinate $(x_0, y_0)$ of the top right edge of the specific area EA and the coordinate $(x_1, y_1)$ of the bottom left edge thereof in order to determine the range of the specific area EA in the main scan direction X and the subscan direction Y. The CPU 25 then outputs the above calculated coordinates $(x_0, y_0)$ and $(x_1, y_1)$ as the write area setting signal to an X section 402a and a Y section 402b of the write area judgment circuit 402, respectively. The X section 402a and the Y section 402b of the write area judgment circuit 402 count the horizontal synchronizing signal Hsync and the clock signal CKA when the image edge signal is input thereto, and judges whether or not the counting value is within the write area setting area. When the counting value x in the main scan direction X of the X section 402a is within the range from the value $x_0$ to the value $x_1$, i.e., $x_0 \leq x \leq x_1$, the X section 402a outputs a Low level signal $\overline{WEX}$ to the X section 403a of the write address generating counter 403. When the counting value y in the subscan direction Y of the Y section 402b is within the range from the value $y_0$ to the value $y_1$, i.e., $y_0 \leq y \leq y_1$, the Y section 402b outputs a Low level signal $\overline{WEY}$ to the Y section 403b of the write address generating counter 403. When the write address generating counter 403 judges that the counting values x and y are within the write area, the counter 403 generates a write address and outputs it to the address terminal of the RAM 401 through the selector 404. That is, the X section 403a of the write address generating counter 403 counts the clock signal CKA when the Low level signal $\overline{WEX}$ is input thereto, and generates the counting value as the address in the main scan direction X. The address generated by the X section 403a is cleared in accordance with the horizontal synchronizing signal Hsync. Furthermore, the Y section 403b of the write address generating counter 403 counts the horizontal synchronizing signal Hsync when the Low level signal $\overline{WEY}$ is input thereto, and generates the counting value as the address in the subscan direction Y. The addresses generated by the X section 403a and the Y section 403b are cleared in accordance with the image edge signals which are generated by the CPU 25.

The write address generating counter 403 comprises a multiplier (not shown) for calculating addresses of one dimension, each of which is a product of the address in the main scan direction X generated by the section 403a and the address in the subscan direction Y generated by the Y section 403b.

When the address of one dimension is to be generated by the write address generating counter 403 and the image data is to be stored in the RAM 401, the data hold signal is set at a Low level, and the write/read signal $\overline{W/R}$ is set at a Low level. Then, in accordance with a selecting signal input through the AND gate 405, the selector 404 outputs the address outputted from the write address generating counter 403 to the address terminal of the RAM 401. Also, the clock signal $\overline{CKA}$ is input to the write enable terminal $\overline{WE}$ of the RAM 401 through the inverter 406 and the AND gate 407 so as to allow the image data to be stored in the RAM 401. Furthermore, since the write/read signal $\overline{W/R}$ is set at a Low level as described above, the low level write/read signal $\overline{W/R}$ is input to the disable terminal of the buffer amplifier 422 through the AND gate 405, the buffer amplifier 422 through the AND gate 405, the buffer amplifier 422 is enabled only on the condition that image data of a document is stored in the RAM 401, i.e., the low level signals are outputted from the read area judgment circuit 408 to the AND gate 405, and then, the buffer amplifier 422 outputs the image data to the data terminal of the RAM 401.

Only the image data of the area which the write area judgment circuit 402 judges within the specific area in the main scan direction X and the subscan direction Y can be stored in the RAM 401. When the image data of the above area has been stored in the RAM 401 completely, the CPU 25 outputs the High level data hold signal to the write enable signal $\overline{WE}$ of the RAM 401 through the AND gate 407 so as to inhibit the write operation of the RAM 401, resulting in that the image data is held by the RAM 401.

It is necessary to read out the image data stored in the RAM 401 so as to print mosaic monitor images at the specific read area in an output format shown in FIG. 6. The composition of the circuit for reading out the image data is substantially the same as that of the circuit for storing the image data.

The setting values can be judged within the range of the specific read area on the condition that $x_0 \leq x \leq x_1$ and $y_0 \leq y \leq y_1$ and are preset by the CPU 25 in the X section 408a and the Y section 408b of the read area judgment circuit 408. The coordinates $x_0$ and $y_0$ are an X-coordinate and a Y-coordinate of the top left edge of the specific read area, respectively, and $x_1$ and $y_1$ are an X-coordinate and a Y-coordinate of the bottom right edge thereof, respectively, as shown in FIG. 6. After the image edge signal is input to the read area judgment circuit 408 when the document is scanned, the read area judgment circuit 408 counts the horizontal synchronizing signal Hsync and the clock signal CKA, and also judges whether or not the counting values thereof are within the range of the specific read area. Then, when the counting value in the main scan direction X is within the range of the specific read area, the X section 408a of the read area judgment circuit 408 outputs the low level signal $\overline{REX}$ to the X section 409a of the read address generating counter 409. When the counting value in the subscan direction Y is within the range of the specific read area, the Y section 408b of the read area judgment circuit 408 outputs the low level signal $\overline{REY}$ to the Y section 409b of the read address generating counter 409.

When the read area judgment circuit 408 judges that the image data read by the reading section 100 is within the read area, i.e., when the low signals $\overline{REX}$ and $\overline{REY}$ are input to the read address generating counter 409 and the read address generating counter 409 generates the read address, the read address generating counter 409 then outputs the generated read address to the address terminal of the RAM 401 through the selector 404, since the high write/read signal $\overline{W/R}$ is input to the selector 404 when the image data stored in the RAM 401 is read out. That is, the X section 409a of the read address generating counter 409 counts the clock signal CKA when the low signal $\overline{REX}$ is input thereto, and generates the address in the main scan direction X. The address generated by the X section 409a is cleared in accordance with the horizontal synchronizing signal Hsync. Furthermore, the Y section 409b of the read address generating counter 409 counts the subscan clock signal input from the subscan clock generator 29 when the low level signal $\overline{REY}$ is input thereto, and generates the address in the subscan direction. The Y section 409b counts the subscan clock signal in place of the horizontal synchronizing signal Hsync in order to vary the magnification. It is to be noted that the address generated by the Y section 409b is cleared in accordance with the image edge signal generated by the CPU 25. In the read address generating counter 409, the product of the address in the main scan direction X generated by the X section 409a and the address in the subscan direction Y generated by the Y section 409b are calculated by a multiplier (not shown), and the calculated product is outputted as an address of one dimension to the RAM 401 through the selector 404.

The image data read out from the RAM 401 is sent to the masking process circuit 24 through the selector 446. When the read address counter 409 generates an address larger than the maximum address of the RAM 401, the X and Y sections 409a and 409b output an overflow signal $X_0$ and an overflow signal $Y_0$ to the color tone setting circuit 2. The occurs every time the counting values of the X and Y sections 409a and 409b become larger than the maximum counting values thereof, and then the X and Y sections 409a and 409b begin once again to count the values from the initial values. The overflow signals $X_0$ and $Y_0$ are used for printing a plurality of images having different color tones which are arranged in a row in the mosaic monitor mode.

Furthermore, since the write/read signal $\overline{W/R}$ become a high level signal when the image data stored in the RAM 401 is read out, the low write/read signal $\overline{W/R}$ is input to the output enable terminal $\overline{OE}$ of the RAM 401 through the AND gate 405 and the inverter 423, and then the image data stored in the RAM 401 can be read out in the read area, i.e., when $\overline{REX}$="Low" and $\overline{REY}$="Low". On the other hand, since the low write/read signal is input to the three-state buffer amplifier 422 through the AND gate 405 when $\overline{REX}$="Low" and $\overline{REY}$="Low", the output terminal of the three-state buffer amplifier 422 attains a high impedance state, and the input terminal of the buffer amplifier 422 is then separated from the data terminal of the RAM 401.

Furthermore, when image data stored in the RAM 401 can be read out, i.e., when $\overline{OE}$="Low", the selector 446 selects the image data out from the RAM 401 in accordance with the trimming control signal input through the AND gate 448. Otherwise, the selector 446 selects white data in order to print a white image in the area of a copying paper other than the area where the image of the image data is to be printed. Then coordinates which take into consideration the difference between the magnification upon reading out an image of a document and the magnification upon printing the image of the image data stored in the RAM 401 are set in the read area judgment circuits 408a and 408b, respectively. It is to be noted that the period of the subscan clock signal is varied according to the magnification needed when reading out an image of a document.

In the case where the 3×9 block images are printed as shown in FIG. 6, the image data is read out from the RAM 401 in the following manner. Image data on the same line is read out in the main scan direction X three times, and the image data is read out row by row until the whole area has been read out, and then the image data is read out in the main scan direction from the top line again.

When the X and Y sections 408a and 408b of the read area judgment circuit 408 output the low signals $\overline{REX}$ and $\overline{REY}$ to the X and Y sections 409a and 409b of the read address generating counter 409, respectively, the X and Y sections 409a and 409b generate the address, and the image data stored in the generated address is read out and is sent to the masking process circuit 24 through the selector 446. The CPU 25 sets setting values in the X section 408a which can judge whether the counting value x is in the range of the read area, i.e., if $x_0 \leq x \leq x_1$, and also the CPU 25 sets setting values in the Y section 408b which can judge whether the counting value y is in the range of the read area, i.e., if $y_0 \leq y \leq y_1$. When the counting value of the read address generating counter 409 becomes larger than the value which is the maximum size of one block (i.e., $(x_1-x_0)/3$), the read address generating counter 409 outputs the overflow signal $X_0$, and starts to count the value from an initial value again, and the image data in the same row continues to be read out. The above process is performed repeatedly three times. When the Y section 409b of the read address generating counter 409 counts the value $(y_1-y_0)/9$ in the subscan direction, three blocks of image data has been read out completely, and the Y section 409b outputs the overflow signal $Y_0$. Thus, three images are printed in the horizontal direction on a copying paper. The printing operation of printing three images in the horizontal direction is performed repeatedly in the subscan direction nine times, and thus, the mosaic monitor image including 27 image blocks (3×9) is printed on the copying paper.

Figure 14A:
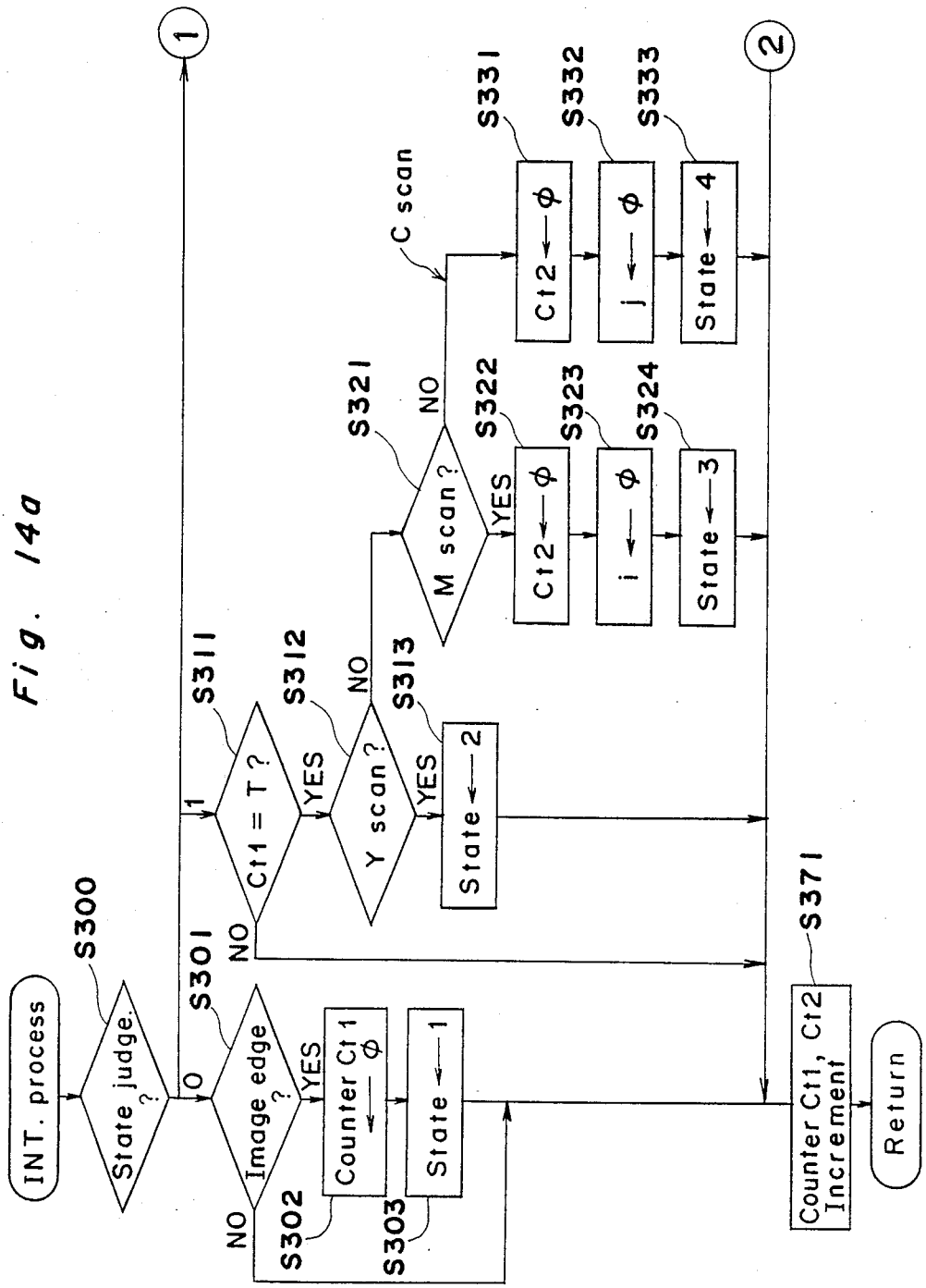
FIGS. 14a and 14b are flow charts of an interruption process.
Figure 14B:
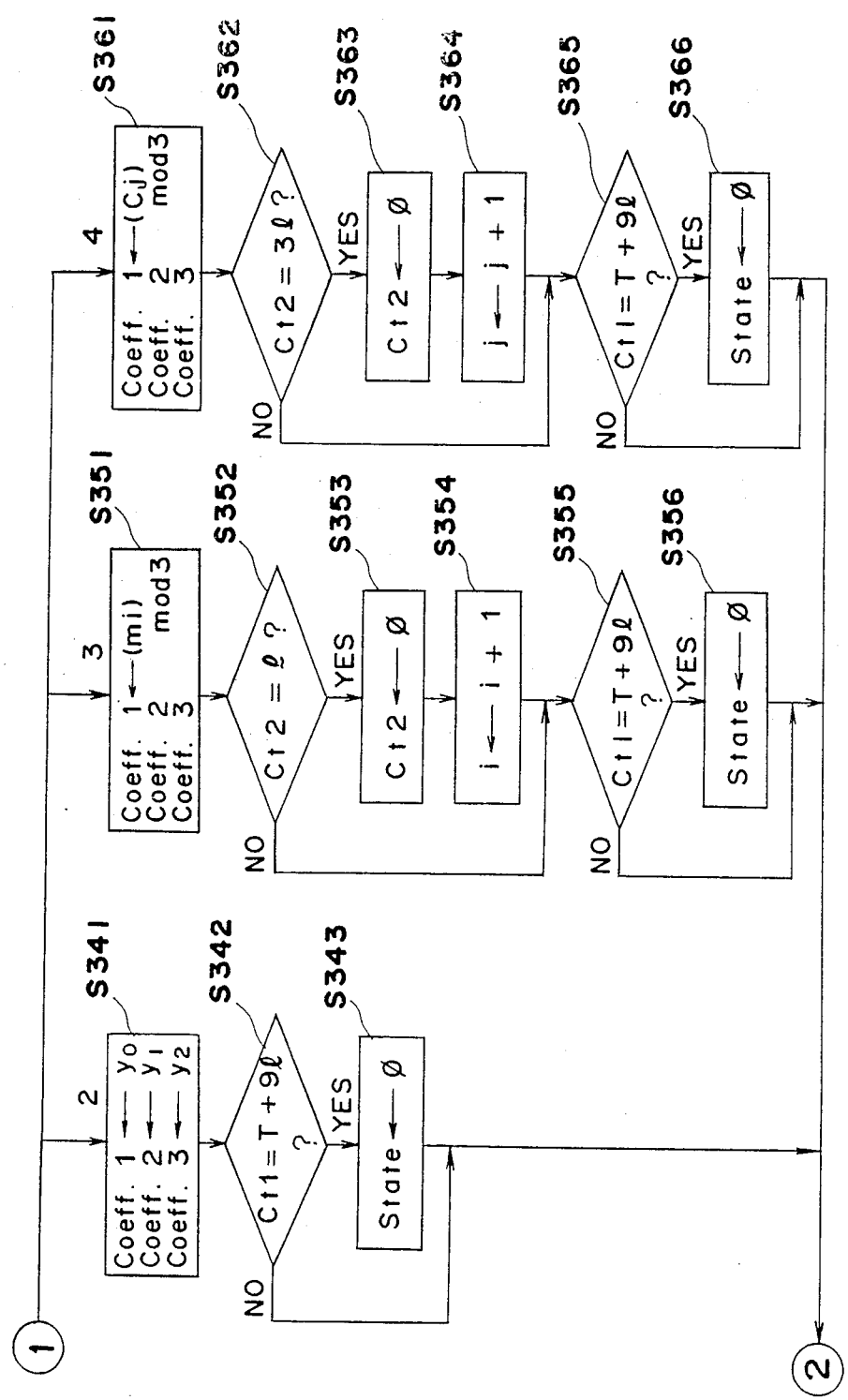

Since different color adjustment coefficients are set at different blocks of the mosaic monitor image in accordance with the overflow signals $X_9$ and $Y_0$ as shown in FIGS. 14a and 14b, respective images for which different color adjustments are made are printed on the copying paper.

Since different color adjustment coefficients are set at different blocks of the mosaic monitor image in accordance with the overflow signals $X_0$ and $Y_0$ as shown in FIGS. 14a and 14b, respective images for which different color adjustments are made are printed on the copying paper.

(5) Control flow in the mosaic monitor mode.

Figure 11:
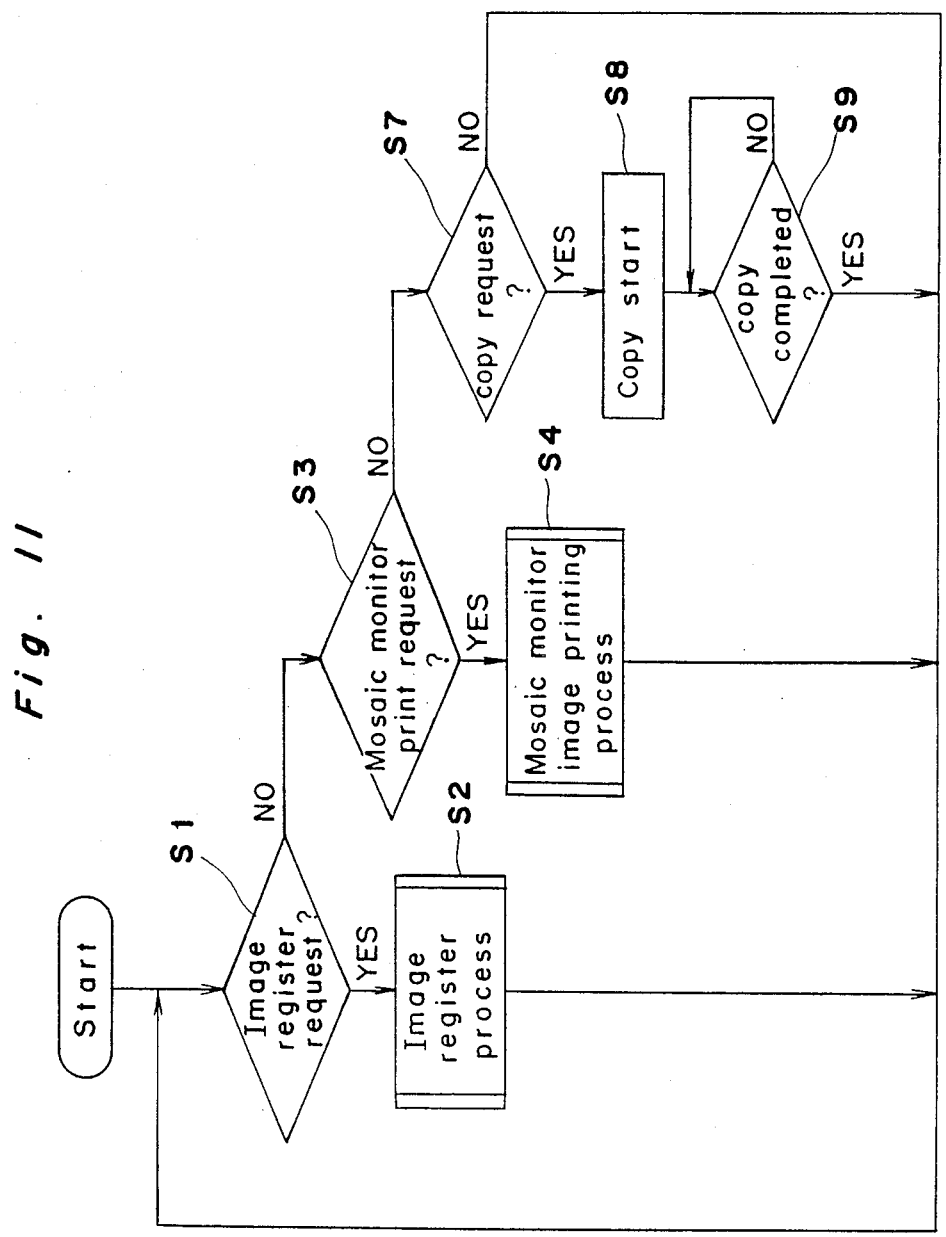
FIG. 11 is a flow chart of a main flow of a mosaic monitor mode of the digital color copying machine shown in FIG. 1.

FIG. 11 is a flow chart of the main flow of the mosaic monitor mode performed by the CPU 25 for controlling the digital color copying machine. When the function key 79 of the operation panel 70 is pushed down, the program flow of the digital color copying machine goes to the main flow of the mosaic monitor mode when the mosaic monitor mode is selected. An image register process is then required (YES at step S1), and a mosaic monitor print is required (YES at step S3).

Figure 12:
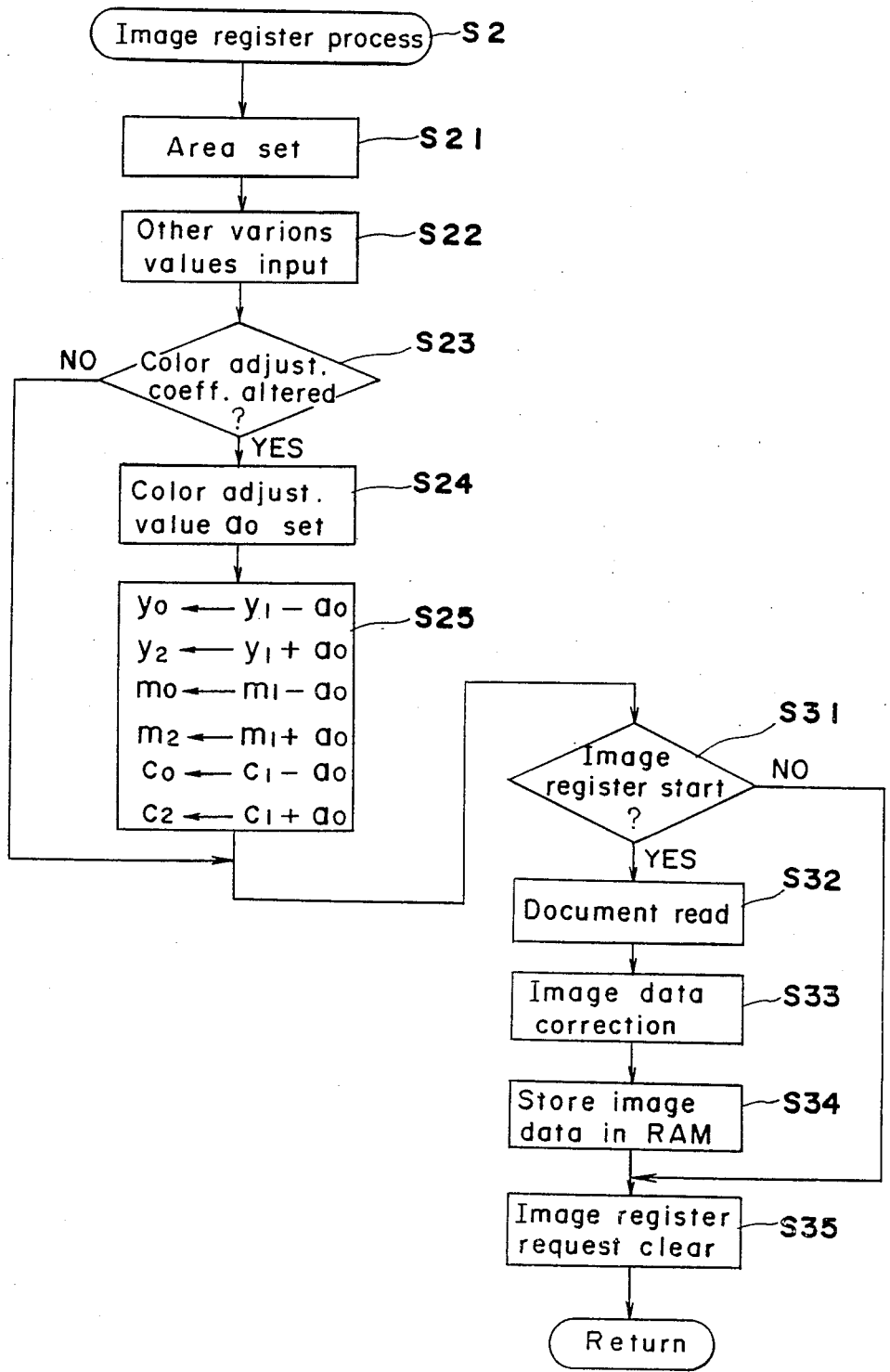
FIG. 12 is a flow chart of an image register process shown in FIG. 11.

If the image register process is required (YES at step S1), the image register process shown in FIG. 12 is performed at step S2.

In the above image register process, an image of a document is read by the reading section 100, and the read image is displayed on the display section 83. Thereafter, a specific area EA is set by using the jog dials 82 and 83, and the set key 76, and the address of the specific area EA is outputted to the write area adjustment circuit 402.

Figure 13:
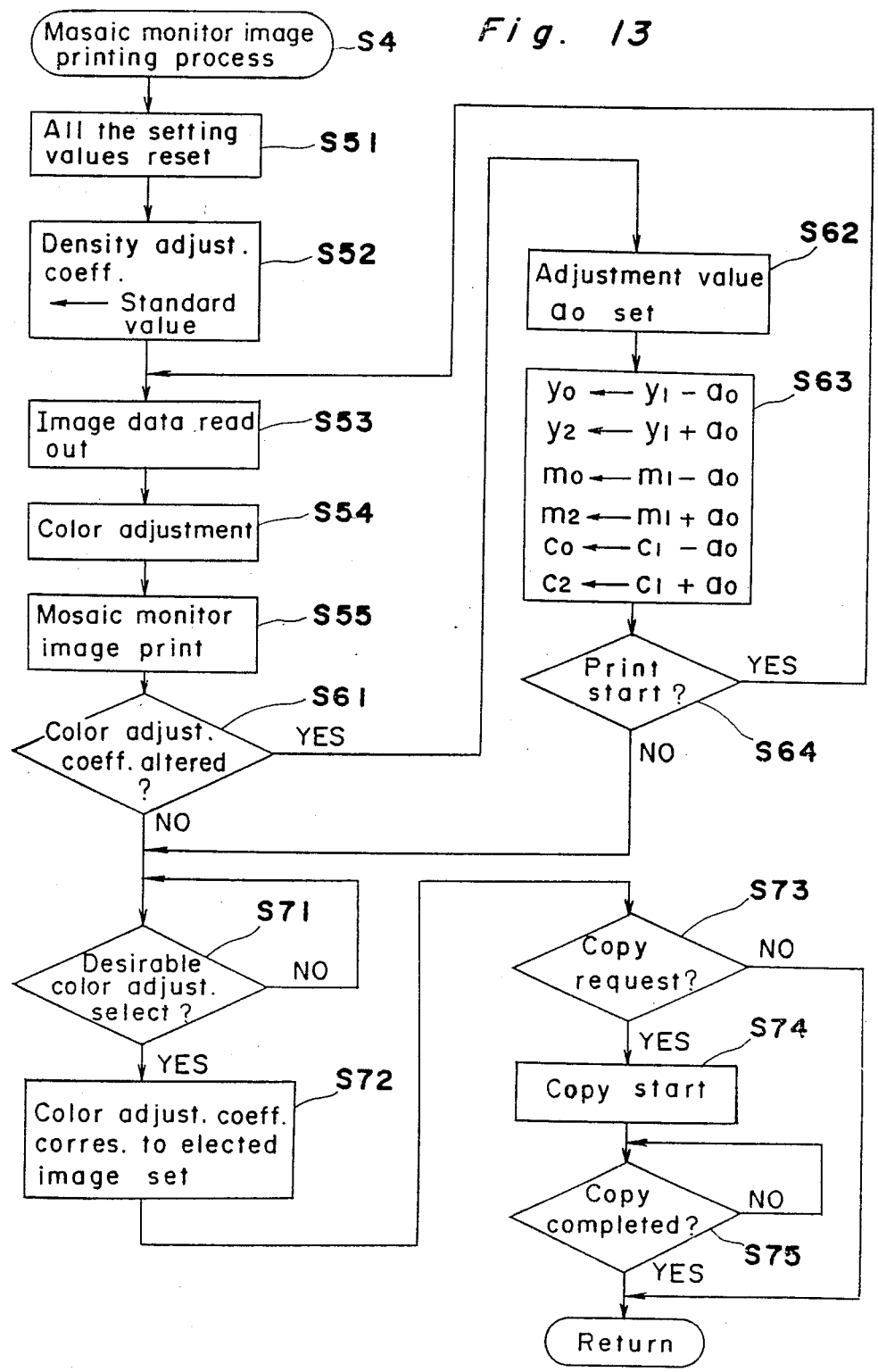
FIG. 13 is a flow chart of a mosaic monitor image printing process shown in FIG. 11.

If it is required to print the mosaic monitor image on a copying paper (YES at step S3), the mosaic monitor image printing process shown in FIG. 13 is performed at step 4. In the mosaic monitor printing process, the image data stored in the RAM 401 is read out, and various kinds of color adjustments are made for the read image data, and thereafter, the mosaic monitor image comprised of the images for which the above color adjustments are made is displayed on the display section 84. Then, a number of copying conditions such as the number of prints and the magnification are reset to predetermined initial states, and the level of the density adjustment is set at a standard level. Thereafter, the operator selects an image having a desirable color tone from the mosaic monitor image displayed on the display section 84, pushes down the print start key 71 of the operation panel 70 in order to request a copying operation (YES at step S7). The copying operation is started at step S8, and when the copying operation is completed (YES at step S9), the image having the selected color tone is printed on the copying paper.

If the image register is not required (NO at step S1) and it is not required to print the mosaic monitor image on a copying paper (NO at step S3), the above copying operation is performed at steps S7 to S9.

FIG. 12 is a flow chart of the image register process of step S2 shown in FIG. 11.

Referring to FIG. 12, when the set key 76 of the operation panel 70 is pushed down, a specific area EA is set on the display section 84 by using the jog dials 82 and 83, and the set key 76, and the area setting value of the specific area EA is input at step S21. Furthermore, other various input values are set at step S22.

Thereafter, at step S23 it is judged whether or not the color adjustment coefficients $K_y$, $K_m$ and $K_c$ have been altered. If a value is input by the ten keys 75, it is judged that the color adjustment coefficients have been altered. If a numerical value is input by the ten keys 75, the input value is set as the aforementioned adjustment value $a_0$ at step S24. Thereafter, the color adjustment coefficients are altered by using the adjustment value $a_0$ as follows:

$$y_0 = y_1 - a_0$$

$$y_2 = y_1 + a_0$$

$$m_0 = m_1 - a_0$$

$$m_2 = m_1 + a_0$$

$$c_0 = c_1 - a_0$$

$$c_2 = c_1 + a_0$$

Thereafter, it is judged whether or not the image register is to be started at step S31. If the image register is to be started (YES at step S31), the coordinates of the top right edge and the bottom left edge of the registered image area are calculated from the area setting values which are input at step S21, and the calculated coordinates are outputted to the write area judgement circuit 402. Thereafter, an image of the above registered image area of a document is read by the reading section 100 at step S32, the shading correction is made for the image data of the image which is read at step S32, and the corrected image data is stored in the RAM 401 at step S34. The image register request is cleared at step S35, and the program flow returns. On the other hand, if the image register is not started (NO at step S31), the image register request is cleared at step S35, and then, the program flow returns.

FIG. 13 is a flow chart of the mosaic monitor image printing process (step S4 in FIG. 11).

Referring to FIG. 13, all the setting values used for the mosaic monitor are reset at step S51, and the density adjustment coefficient is set at a standard value at step S52. That is, when the density adjustment coefficient is altered from the standard value by the operator, the density adjustment coefficient is returned to the standard value by step S52, and thus the operator is prevented from selecting a color adjustment in the mosaic monitor by mistake.

Thereafter, the image data of the specific area stored in the RAM 401 is read out at step S53, and the color adjustment coefficients $y_i$, $m_i$ and $c_i$ are outputted to the color tone setting circuit 2 so as to make a color adjustment at step S54. The mosaic monitor image is then printed on a copying paper at step S55.

Thereafter, at step S61 it is judged whether the color adjustment coefficients $y_i$, $m_i$ and $c_i$ have been altered, i.e., whether the density correction key 80 of the operation panel 70 has been pushed down. If the set key 76 has been pushed down, a predetermined adjustment value $a_0$ corresponding to the level of the color adjustment set by the density correction key 80 is set at step S62. Thereafter, the color adjustment coefficients $y_i$, $m_i$ and $c_i$ are altered at step S63 by using the adjustment value $a_0$ set at step S62 as follows:

$y_0 = y_1 - a_0$ $y_2 = y_1 + a_0$ $m_0 = m_1 - a_0$ $m_2 = m_1 + a_0$ $c_0 = c_1 - a_0$ $c_2 = c_1 + a_0$

Thereafter, when it is judged that the print start key 71 has been pushed down (YES at step S64), the program flow returns to step S53, and the print operation of the mosaic monitor image is started. At that time, an image of a document need not be scanned, and the image data stored in the RAM 401 is read out. Thereafter, the color adjustment is made for the read image data at step S54, and an image corresponding to the image data is printed on a copying paper at step S55. On the other hand, when it is judged that the print start key 71 has not been pushed down (NO at step S64), the program flow goes to step S71.

Thereafter, the operator selects an image block from the mosaic monitor image displayed on the display section 84 at step S71, and the color adjustment coefficients $K_y$, $K_m$ and $K_c$ corresponding to the selected image are set at step S72.

When the print start key 71 is pushed down in order to request the copying operation (YES at step S73), the scan of the document is started, and the copying operation for printing the image of the document for which the color adjustment is made with the set color adjustment coefficients $y_i$, $m_i$ and $c_i$ is started at step S74. Thereafter, when the above copying operation is completed at step S75, the program flow returns.

FIGS. 14a and 14b are flow charts of an interruption process for setting the color adjustment coefficients. This interruption process is performed when the horizontal synchronizing signal Hsync is input to the CPU 25 so that the operation of the CPU 25 is interrupted.

In the interruption process, a counter $Ct_1$, counts a distance in the subscan direction Y from the edge of the image formed on a copying paper P shown in FIG. 6 so as to detect the print start point $P_0$ and the print end point $P_1$ of the mosaic monitor image GM. A counter $Ct_2$ counts a distance in the subscan direction so as to detect respective blocks of images of the mosaic monitor image. In FIG. 6, T denotes a distance in the subscan direction between the edge of the image and the print start point of the mosaic monitor image, and l denotes a distance in the subscan direction of one block of the images of the mosaic monitor image.

Referring to FIG. 14a, first of all, the program flow goes to one of step S301, S311, S341, S351 and S361 according to a state number at step S300. It is to be noted that the state number is set at "0" at the beginning of the print operation of the mosaic monitor image.

If the state number is "0" at step S300, it is judged whether or not the scanning point of the document has passed through the edge of the image formed on the copying paper P at step S301. When the scanning point has passed through the edge of the image (YES at step S301), the counting value of the counter $Ct_1$ is initialized at step S302, and "1" is set as the state number at step S303. Thereafter, the program flow goes to step S371. On the other hand, when the scanning point has not passed through the edge of the image (NO at step S301), the program flow goes to step S371, directly.

If the state number is "1" at step S300, it is judged whether or not the counting value of the counter $Ct_1$ is equal to a value T at step S311, i.e., whether the scanning point has reached the position of the coordinate $y_0$ which is the edge of the mosaic monitor image GM. When the counting value of the counter $Ct_1$ is equal to the value T (YES at step S311), the program flow goes to one of steps S313, S322 and S331 according to the color of toner supplied by the development units 45a to 45c. That is, when the color of toner is yellow (YES at step S312), "2" is set as the state number at step S313. When the color of toner is magenta (YES at step S321), the counting value of the counter $Ct_2$ is initialized at step S322, "0" is set as the value of the variable i at step S323, and "3" is set as the state number at step S324. On the other hand, when the counting value of the counter $Ct_1$ is not equal to the value T (NO at step S311), the program flow goes to step S371 directly. When the color of toner is cyan (NO at step S321), the counting value of the counter $Ct_2$ is initialized, "0" is set as the value of the variable j at step S332, and "4" is set as the state number at step S333.

If the state number is "2" at step S300, a latch signal is outputted to the color tone setting circuit 2 at step S341 so that the values $y_0$, $y_1$ and $y_2$ are latched for the coefficients 1 to 3 of the latches 302, 303 and 304, respectively, and thereafter, it is judged whether or not the counting value of the counter $Ct_1$ is equal to a value $(T+9l)$ at step S342, i.e., whether the scanning point has reached the position of the coordinate $y_1$ which is on the edge of the mosaic monitor image GM. When the counting value of the counter $Ct_1$ is equal to the value $(T+9l)$ (YES at step S342), "0" is set as the state number at step S343, and the program flow goes to step S371. On the other hand, when the counting value of the counter $Ct_1$ is not equal to the value $(T+9l)$ (NO at step S342), the program flow goes to step S371 directly.

If the state number is "3" at step 300, the value $m_i$ is set for the coefficients 1 to 3 of the latches 302 to 304 at step S351, and it is then judged whether or not the counting value of the counter $Ct_2$ is equal to the value l, i.e., whether the scanning point has passed through one image block of the mosaic monitor image GM at step 352. If the counting value of the counter $Ct_2$ is equal to the value l (YES at step S352), the counting value of the counter $Ct_2$ is initialized at step S353, and the variable i is increased by one at step S354. Thereafter, the program flow goes to step S355. On the other hand, if the counting value of the counter $Ct_2$ is not equal to the value l (NO at step S352), the program flow goes to step S355, directly. At step S355, it is judged whether or not the counting value of the counter $Ct_1$ is equal to the value $(T+9l)$, i.e., whether the scanning point has reached the edge of the mosaic monitor image. If the counting value of the counter $Ct_1$ is equal to the value $(T+9l)$ (YES at step S355), "0" is set as the state number at step S356, and the program flow goes to step S371. On the other hand, if the counting value of the counter $Ct_1$ is not equal to the value $(T+9l)$ (NO at step S355), the program flow goes to step S371, directly. That is, in the process which occurs when the state number is "3", the same value $m_1$ is set for the coefficients 1 to 3, and the coefficients 1 to 3 are altered to a new value $m_i+1$ every time the scanning point reaches the next image block of the mosaic monitor image in the subscan direction Y.

If the state number is "4" at step 300, the value $C_j$ is set for the coefficients 1 to 3 of the latches 302 to 304 at step 361, and it is judged whether or not the counting value of the counter $Ct_2$ is equal to a value $(3l)$, i.e., whether the scanning point has passed through three image blocks in the subscan direction of the mosaic monitor monitor image at step S362. If the counting value of the counter $Ct_2$ is equal to the value $(3l)$ (YES at step S362), the counting value of the counter $Ct_2$ is initialized at step S363, the variable j is increased by one at step S364, and the program flow goes to step S365. On the other hand, if the counting value of the counter $Ct_2$ is not equal to the value $(3l)$ (NO at step S362), the program flow goes to step S365, directly.

At step S365, it is judged whether or not the counting value of the counter $Ct_1$ is equal to the value $(T+9l)$, i.e., whether the scanning point has reached the edge of the mosaic monitor image at step S365. If the counting value of the counter $Ct_1$ is equal to the value $(T+9l)$ (YES at step S365), "0" is set as the state number at step S366, and the program flow goes to step S371. On the other hand, if the counting value of the counter $Ct_1$ is not equal to the value $(T+9l)$ (NO at step S365), the program flow goes to step S371 directly. In the above process in which the state number is "4", the same value $C_j$ is set for the coefficients 1 to 3 of the latches 302 to 304, and the coefficients 1 to 3 are altered to a new value $C_j+1$ every time the scanning point passes through three blocks of images of the mosaic monitor image in the subscan direction.

After the above processes for the respective state numbers "1" to "4", the counting value of the counters $Ct_1$ and $Ct_2$ are increased by one at step S371, and the program flow returns. When the above processes are completed, the various coefficients are set for respective image blocks corresponding to respective printing colors, and the color adjustment has then been made for the mosaic monitor image.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A digital color copying machine comprising:
    image reading means for scanning an original document image and generating image data indicating a color;
    color altering means for altering said image data;
    image forming means for forming the original document image on a recording medium in response to altered image data generated by said color altering means;
    mode indicating means for indicating a test mode;
    area indicating means for indicating a partial area of the original document image;
    memory means for storing a collection of the image data corresponding to the partial area indicated by said area indicating means;
    inputting means for manually inputting alteration data related to the color alteration by said color altering means;
    test image signal generating means for reading out said collection of image data stored in said memory means, applying said color altering means to it repeatedly, and performing different color alterations on plural collections of the image data repeatedly using the alteration data inputted by said inputting means, thereby generating plural sets of test image data when the test mode is set by said mode indicating means; and
    control means for controlling the drive of said image forming means in response to the plural sets of test image data generated by said test image generating means, and for forming on predetermined areas of a recording medium a plurality of images of said partial area which have been subjected to different color alterations.

2. The copying machine as claimed in claim 1, wherein said color altering means comprises calculation means for calculating altered image data from the image data generated by the image reading means, said color alteration data inputted by said inputting means being related to a parameter used in the calculation of said calculation means.

3. The copying machine as claimed in claim 2, wherein said calculation means is a multiplier for multiplying the image data by a coefficient related to a color tone, and said inputting means inputs the alteration data related to the coefficient.

4. The copying machine as claimed in claim 1, wherein said color altering means comprises color masking means for converting the image data generated from said image reading means into an image signal corresponding to a printing color, and color adjusting means for performing a color tone adjustment on the image signal converted by said color masking means.

5. The copying machine as claimed in claim 4, wherein said color adjusting means comprises multiplying means for multiplying the image signal converted by said color masking means by a coefficient related to color tone to obtain the altered image data, said alteration data inputted by said inputting means being related to said coefficient.

6. The copying machine as claimed in claim 1, wherein said control means forms a plurality of images of the indicated partial area for which different color alterations are performed, said control means forming said plurality of images in a matrix on one recording medium.

7. The copying machine as claimed in claim 6, further comprising:
  image selecting means for selecting any one of the plural images of the indicated partial area which are formed in the matrix on the recording medium; and
  means for controlling said color altering means so as to perform the color alteration on the entire original document image, thereby performing a copying operation with the color tone of the image selected by said image selecting means.

8. The copying machine as claimed in claim 7, wherein said color altering means comprises calculation means for calculating altered image data from the image data generated by the image reading means, said alteration data inputted by said inputting means being related to a parameter used in the calculation of said calculation means.

9. The copying machine as claimed in claim 8, wherein said calculation means is a multiplier for multiplying the image data by a coefficient related to a color tone, and said inputting means inputs the compensation data related to said coefficient.

10. A digital color copying machine comprising:
  image reading means for scanning an original document image and generating image data indicating a color;
  color adjusting means for adjusting the image data generated by said image reading means;
  image forming means for forming an image of the original document image on a recording medium in response to the image data adjusted by said color adjusting means;
  mode indicating means for indicating a test mode;
  inputting means for manually inputting color tone adjustment data to said color adjusting means; and
  test image forming means for performing a plurality of color adjustment processes using different color tones on a partial specific area on the original document image through use of said color adjusting means, thereby forming a plurality of images of the partial specific area having different color tones and in different positions on the recording medium.

11. The copying machine as claimed in claim 10, wherein said color adjusting means comprises multiplying means for multiplying the image data generated by the image reading means by a coefficient related to color tone to obtain the adjusted image data, said adjustment data inputted by said inputting means being related to said coefficient.

12. The copying machine as claimed in claim 11, wherein said test image forming means forms a plurality of images of the partial specific area on which different color adjustment processes have been performed, said plurality of images being formed in a matrix on one recording medium.

13. The copying machine as claimed in claim 12, further comprising:
  image selecting means for selecting any one of said plurality of images of the partial specific area; and
  means for controlling said color adjusting means so as to perform the color adjustment on the entire original document image, thereby performing a copying operation with the color tone of the image selected by said image selecting means.

14. An image recording apparatus for forming an image on a recording medium in accordance with image data, comprising:
  inputting means for manually inputting color adjustment data;
  color adjusting means for making different adjustments to the image data in accordance with said color adjustment data and for generating sets of color adjusted image data representing different color tones; and
  image forming means for forming a plurality of images having different color tones in different positions on the recording medium in accordance with the color adjusted image data generated by said adjusting means.

15. The image recording apparatus as claimed in claim 14, wherein said color adjusting means performs the adjustment by calculating said color adjusted image data, and aid inputting means inputs a parameter used in said calculation.

16. An image recording apparatus for forming an image on a recording medium in accordance with image data, comprising:
  memory means for storing a collection of image data corresponding to a partial specific area of an entire image;
  inputting means for manually inputting adjustment data related to a color adjustment;
  test image data generating means for repeatedly reading said collection of image data stored in said memory means and for repeatedly performing different adjustments on plural collections of the image data in accordance with said adjustment data, thereby generating test image data corresponding to a test image which includes images of said partial specific area in different color tones; and
  image forming means for forming said test image on the recording medium.

17. The image recording apparatus as claimed in claim 16, wherein said test image data generating means performs the color adjustment by calculating from the image data, and said inputting means inputs a parameter used in said calculation.

18. An image recording apparatus for forming an image on a recording medium in accordance with image data indicating a color, comprising:
  color adjusting means for adjusting said image data;
  means for providing image data corresponding to a partial specific area of an entire image to said color adjusting means repeatedly;
  inputting means for manually inputting color alteration data related to a parameter used in the calculation of said color adjusting means;
  varying means for automatically varying the parameter of the calculation synchronously with the operation of said providing means; and
  image forming means for forming a plurality of images corresponding to the partial specific area in different color tones on the recording medium in accordance with the adjusted image data.

19. An image recording apparatus as claimed in claim 18, further comprising:
  selecting means for selecting any one of the images recorded by said image forming means; and
  latching means for latching the parameter used in the color adjustment to which the selected image has been subjected, so that a later recording operation for the entire image is performed with the selected color adjustment.

20. A digital color copying machine comprising:
  image reading means for scanning an original document image and for generating image data;
  color altering means for altering said image data generated by said image reading means;
  image forming means for forming an image of the original document image on a recording medium in response to the altered image data generated by said color altering means;
  mode indicating means for indicating a test mode;
  area indicating means for indicating a partial area of the original document image;
  memory means for storing a collection of said image data corresponding to the partial area indicated by said area indicating means transmitted from said image reading means;
  test image generating means for reading said collection of partial area image data stored in said memory means, for applying said color altering means to it repeatedly, and for repeatedly performing different alterations on plural collections of partial area image data thereby generating test image data when said test mode is set by said mode indicating means;
  control means for controlling the drive of said image forming means in response to plural sets of test image data generated by said test image generating means, and for forming a plurality of images of said partial area on predetermined areas of a recording medium, said plurality of images having been subjected to different color alterations;
  image density varying means for varying the density of the image to be formed by said image forming means to increase the image density or to decrease the image density from a standard level; and
  density control means for automatically setting the image density at said standard level when said test mode is indicated by said mode indicating means.

21. A digital color copying machine comprising:
  image reading means for scanning an original document image and for generating image data indicating a color;
  color adjusting means for adjusting said image data;
  image forming means for forming an image of said original document image on a recording medium in response to image data which has been adjusted by said color adjusting means;
  mode indicating means for indicating a test mode;
  test image forming means for performing a plurality of color adjustment processes using different color tones on a partial specific area of said original document image, thereby forming a plurality of images of said partial specific area, each image thereof having a different color tone and being located at a different position on a recording medium;
  image density varying means for varying the density of the image to be formed by the image forming means to increase the image density or to decrease the image density from a standard level; and
  density control means for automatically setting said image density at said standard level when said test mode is indicated by said mode indicating means.

22. An image recording apparatus for forming an image on a recording medium in accordance with image data indicating a color, comprising:
  mode indicating means for indicating a test mode and a normal recording mode;
  color adjusting means for performing different adjustments to said image data and for generating color adjusted image data indicating different color tones when said mode indicating means indicates said test mode;
  test image forming means for forming a plurality of images having different color tones in different positions on a recording medium in accordance with said color adjusted image data; and
  density control means for automatically setting an image density level at a standard level when said test mode is indicated by said mode indicating means.

23. The image recording apparatus as claimed in claim 22, further comprising level setting means for allowing manual setting of said image density level when said mode indicating means indicates said normal recording mode, and for generating color adjustment data when said mode indicating means indicates said test mode, said data generation being independent of said image density level manually set through said level setting means.

24. An image recording apparatus for forming an image on a recording medium in accordance with image data, comprising:
  mode indicating means for indicating a test mode and a normal mode;
  memory means for storing a collection of image data indicating the color of a partial specific area of an entire image;
  test image generating means for repeatedly reading said collection of image data and for repeatedly performing different adjustments on plural collections of said partial specific area image data, thereby generating, when the test mode is indicated by said indicating means, test image data corresponding to a test image which includes a plurality of images of said partial specific area having different color tones;
  image forming means for forming said test image on said recording medium; and
  density control means for automatically setting an image density level at a standard level when the test mode is indicated by said mode indicating means.

25. The image recording apparatus as claimed in claim 24, further comprising level setting means for manually setting said image density level when said mode indicating means indicates the normal recording mode and for generating color alteration data when said mode indicating means indicates the test mode, said data generation being independent of said image density level manually set through said level setting means.

* * * * *